United States Patent
Cho et al.

(10) Patent No.: US 7,940,733 B2
(45) Date of Patent: May 10, 2011

(54) DEVICE FOR SETTING OF A SERVICE ZONE IN A MOBILE COMMUNICATION NETWORK, METHOD AND SYSTEM FOR PROVIDING ZONE-BASED SERVICE USING THE DEVICE, AND MOBILE COMMUNICATION UNIT

(75) Inventors: Yul-Jea Cho, Seoul (KR); Jong-Deug Kim, Seoul (KR); Hyung-Mok Kim, Seoul (KR)

(73) Assignee: LG Uplus Corp (KR)

( * ) Notice: Subject to any disclaimer, the term of this patent is extended or adjusted under 35 U.S.C. 154(b) by 808 days.

(21) Appl. No.: 11/718,417

(22) PCT Filed: Mar. 22, 2006

(86) PCT No.: PCT/KR2006/001050
§ 371 (c)(1),
(2), (4) Date: May 2, 2007

(87) PCT Pub. No.: WO2006/101351
PCT Pub. Date: Sep. 28, 2006

(65) Prior Publication Data
US 2008/0123605 A1    May 29, 2008

(30) Foreign Application Priority Data

Mar. 22, 2005 (KR) .................. 10-2005-0023862
Sep. 2, 2005 (KR) .................. 10-2005-0081512
Sep. 2, 2005 (KR) .................. 10-2005-0081513
Sep. 2, 2005 (KR) .................. 10-2005-0081514
Sep. 2, 2005 (KR) .................. 10-2005-0081516

(51) Int. Cl.
*H04W 4/00* (2009.01)
*H04W 24/00* (2009.01)
*H04M 11/04* (2006.01)
*H04M 1/725* (2006.01)

(52) U.S. Cl. .................. 370/338; 455/422.1; 455/404.2; 455/414.2; 455/456.3

(58) Field of Classification Search ............... 455/422.1, 455/404.2, 414.1, 414.2, 456.1, 456.3, 456.5, 455/456.6, 457, 566; 370/338
See application file for complete search history.

(56) References Cited

U.S. PATENT DOCUMENTS 6,888,811 B2 * 5/2005 Eaton et al. .................. 370/338
(Continued)

FOREIGN PATENT DOCUMENTS

| JP | 2004023768 | 1/2004 |
|---|---|---|
| JP | 2004180204 | 6/2004 |
| WO | 2004/054137 | 6/2004 |

OTHER PUBLICATIONS

International Search Report, dated Jun. 27, 2006.

Primary Examiner — Un C Cho
(74) Attorney, Agent, or Firm — Cantor Colburn LLP

(57) ABSTRACT

Provided are a device for setting a service zone for a predetermined zone-based service provided by a mobile communication system for at least one mobile communication unit to which a mobile communication service is provided by the mobile communication system, the device comprising a local area wireless communication unit, wherein the local area wireless communication unit performs local area wireless communication with the mobile communication unit and the device sets a range in which the local area wireless communication is available as the service zone of the mobile communication unit, a method and a system for providing a zone-based service using the device, and a mobile communication unit for providing the zone-based service.

50 Claims, 15 Drawing Sheets

U.S. PATENT DOCUMENTS 7,107,051 B1* 9/2006 Walker .................... 455/432.1
7,650,112 B2* 1/2010 Utsumi et al. ............. 455/11.1
2003/0045280 A1* 3/2003 Simons ..................... 455/422
2004/0014422 A1* 1/2004 Kallio ...................... 455/41.1

* cited by examiner

FIG. 1 [Prior Art]
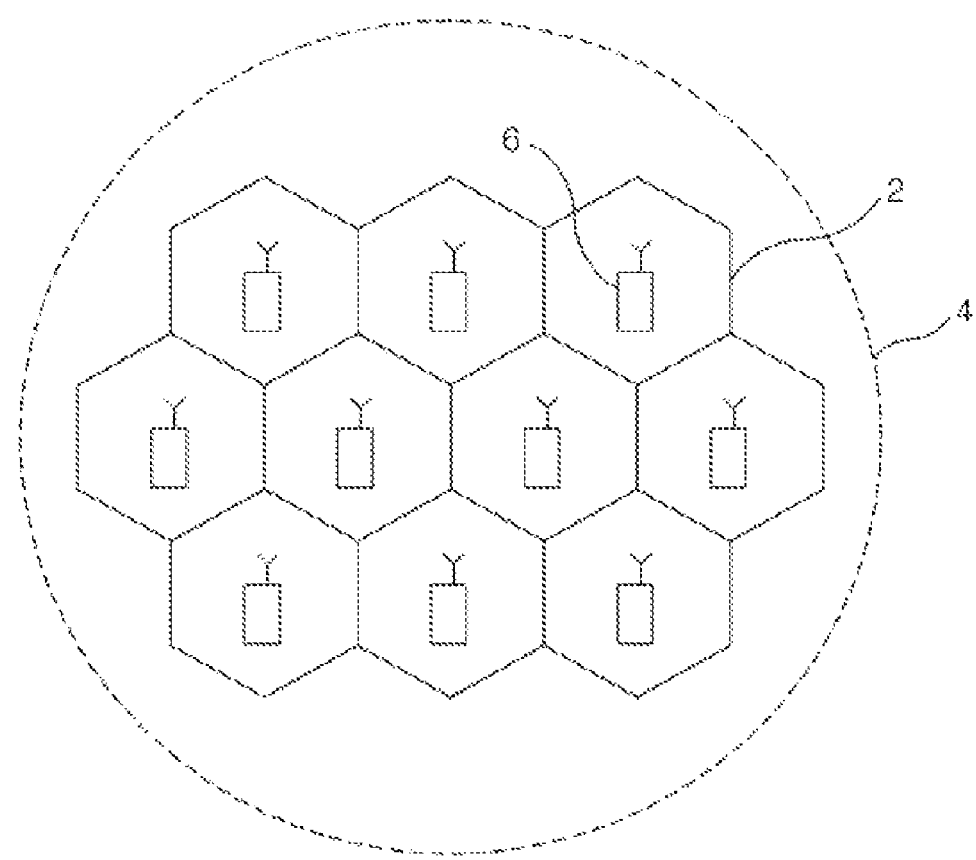

FIG. 2A [Prior Art]
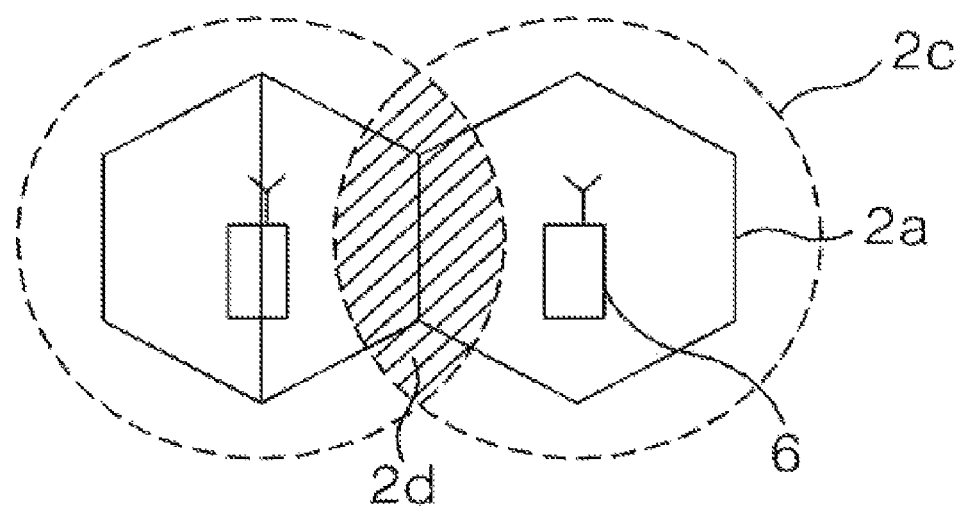
FIG. 2B [Prior Art]
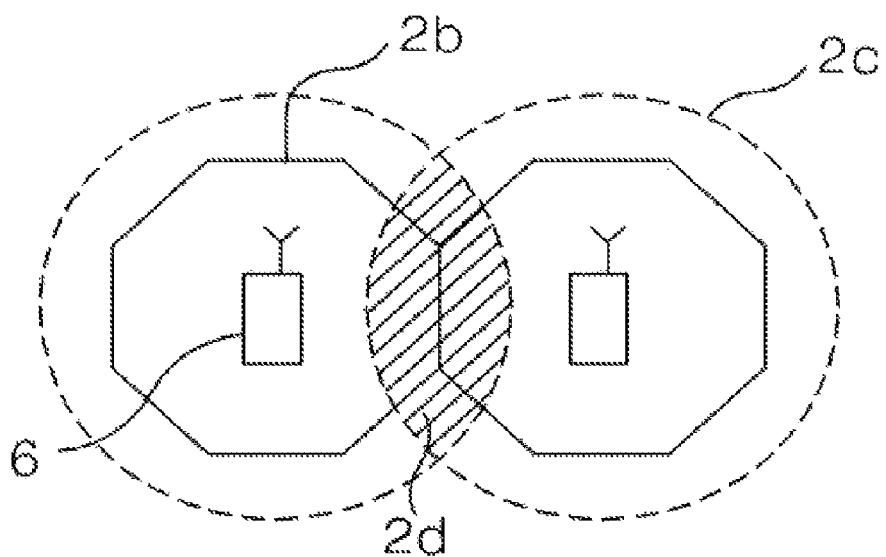

FIG. 3A    [Prior Art]
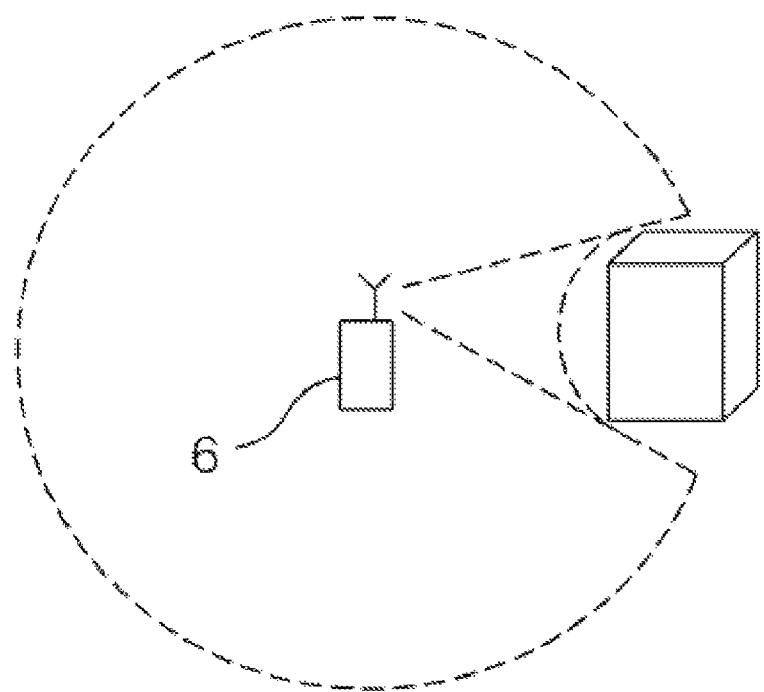
FIG. 3B    [Prior Art]
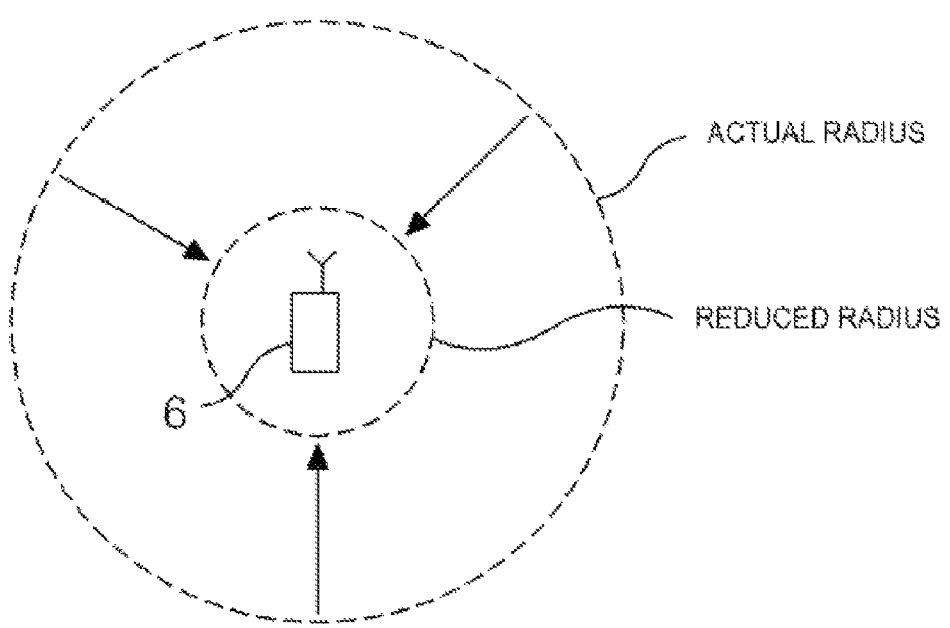

FIG. 4 [Prior Art]
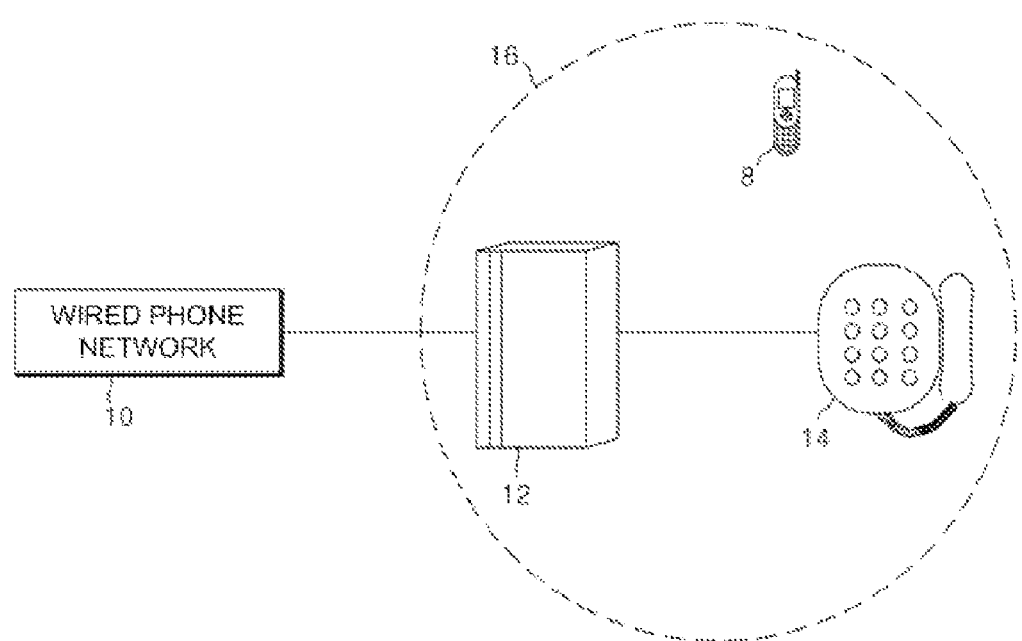

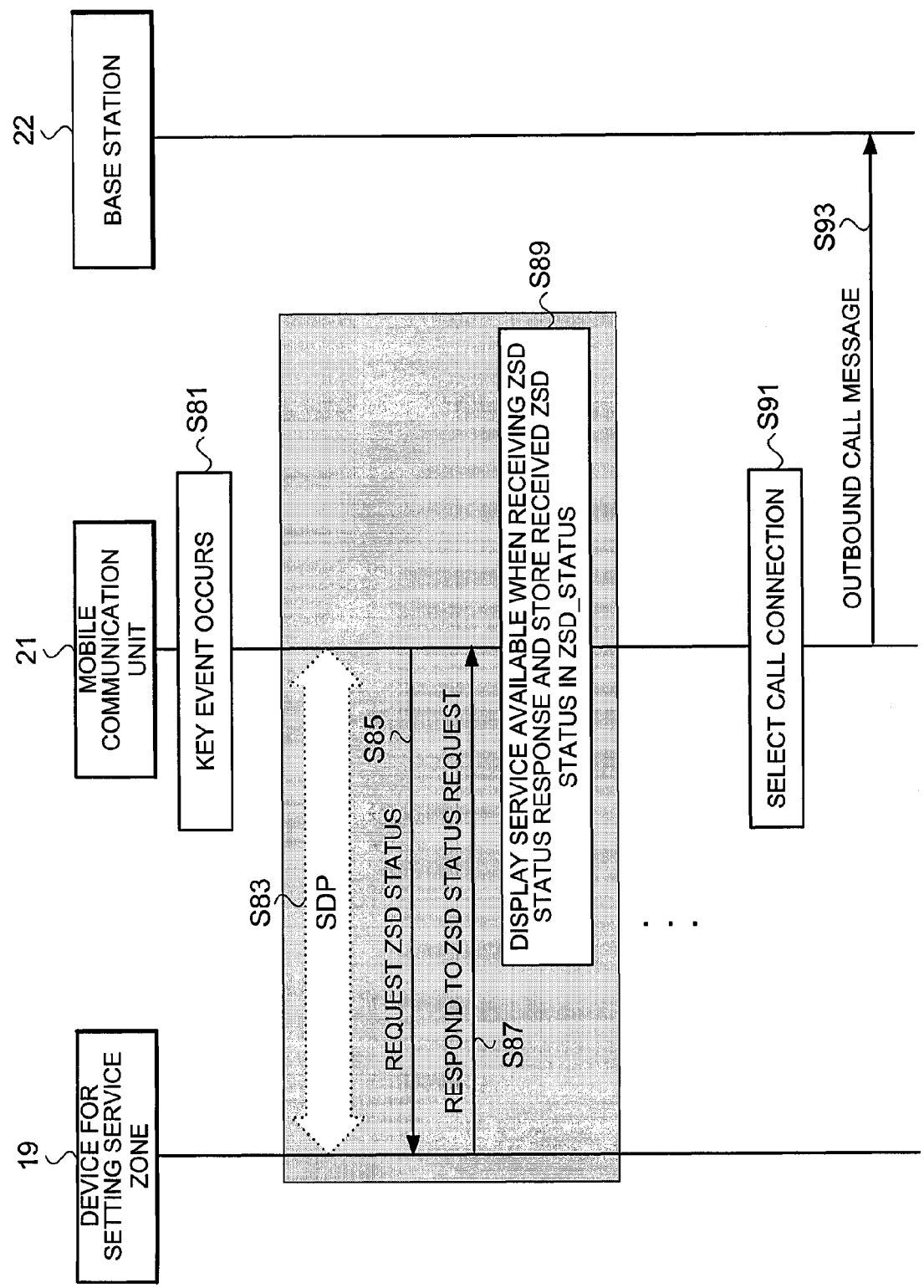

DEVICE FOR SETTING OF A SERVICE ZONE IN A MOBILE COMMUNICATION NETWORK, METHOD AND SYSTEM FOR PROVIDING ZONE-BASED SERVICE USING THE DEVICE, AND MOBILE COMMUNICATION UNIT

TECHNICAL FIELD

The present invention relates to a device for setting a service zone in a mobile communication network so that an effective zone-based service can be provided in the mobile communication network, a method and a system for providing a zone-based service using the device, and a mobile communication unit for providing the zone-based service.

BACKGROUND ART

As communication technology has been recently developed, many communication services using a wired or wireless manner have been provided to users. In wired communication systems, optical communication networks can be implemented by the development of a system related to the development of optical fiber and transmission speed and amount of voice and data have been increased. In addition, in wireless communication systems, voice and data services can be simultaneously provided to users during moving at a high speed. Furthermore, in wireless communication services, owing to mobile phone services using technology such as code division multiple access (CDMA), frequency division multiple access (FDMA), and time division multiple access (TDMA) and owing to wireless Internet services using technology such as wireless LAN, CDMA, and wireless broadband Internet (WBI), the number of service provision areas and the number of users have been rapidly increased.

Due to the development of wireless communication technology and an increase in the number of users of corresponding wireless communication services, service providers and users should consider the reliability and effectiveness of a method of imposing fees and providing services.

In this regard, communication service providers suggest various discount benefits and corresponding methods of imposing service fees so as to keep own customers and to attract new customers. The suggestions include mobile phone service providers' local discount services and DU phone services in which a mobile phone and a wired phone network are connected to each other.

Local discount services use cell-based technology in which discount benefits are provided to communication fees within a region in which a specific base station provides services. Here, cell-based technology is applied to a system having a base station, such as a mobile phone system and wireless Internet etc.

FIG. 1 illustrates a cell and a zone of a conventional mobile phone system. Referring to FIG. 1, the conventional mobile phone system includes a base station 6 which performs voice and data communication in a direct connection with a subscriber's mobile phone. The base station 6 constitutes a cell 2 which is a service provision area ranging from several hundreds of meters to several kilometers. In addition, for the reasons of subscribers and base station management etc., a zone 4 in which a plurality of cells, that is, a plurality of base stations 6, are regarded as one region is formed.

FIGS. 2A and 2B respectively illustrate cells formed in various shapes in the conventional mobile phone system, and FIGS. 3A and 3B respectively illustrate a cell of which radius is reduced or distorted.

Referring to FIGS. 2A, 2B, 3A, and 3B, for a design convenience of a communication network, the shape of the cell may be considered to be a polygonal shape such as a hexagon 2a and an octagon 2b. In actuality, since the cell has a circle 2c, an overlapped region 2d with an adjacent cell exists. A mobile phone that reaches the overlapped region 2d takes a procedure for changing a base station for providing a better communication environment and a base station (or a cell) for setting a call, such as a hand-off. However, for the reasons of topography, the number of subscribers in a cell and building etc., it is difficult for the cell to keep a circular shape. For example, if a district in which the base station 6 is installed is a farm district where a rice field or a low hill exists, the cell has a similar shape to an idealistic circle. In the farm district, an average of the number of mobile phones that keep a call with one base station 6 is smaller than the number of mobile phones in a dense district such as a city, the radius of the cell increases. On the other hands, if the district in which the base station 6 is installed is a city district in which many high buildings exist or a mountain district, it is difficult for the cell to keep the circular shape. Furthermore, since, in the city district, there are many mobile phones, that is, subscribers, in one cell, the radius of the cell is set to be considerably smaller than compared to the farm district. In the city district, an electric wave sent from the base station 6 is reflected and absorbed by buildings etc., therefore it is difficult to obtain an area of the cell. Since a plurality of mobile phones exists in one building, the number of mobile phones which the base station 6 accommodates may be exceeded. In this case, even if the radius of the cell is set to be 1 km, due to the above-described conditions, it can be reduced to be less than several tens of meters or several meters.

If the mobile phone system provides the cell-based local discount service, due to factors such as area and time etc., even a subscriber who is at the same distance from the predetermined base station 6 may be a subscriber to whom the local discount service is provided and a subscriber to whom the local discount service is not provided. In other words, the local discount service cannot be provided to a subscriber who has subscribed the local discount service, in a corresponding area. For this reason, unlike the object of service provision, a negative effect, such as a service improvement demand or secessions of local discount service subscribers, is generated by a subscriber to whom the local discount service is not provided.

FIG. 4 is a schematic view of a structure of a conventional DU phone service system. Referring to FIG. 4, the DU phone service is a service in which a service area is set and a mobile phone in the set area is connected to a wired phone network 10 using an access point of a service area (not the base station 6). For example, in a conventional wired phone system, an access point 12 which connects a phone 14 to a wired phone network 10 and interworks between a mobile phone 8 and the wired phone network 10 is installed. The access point 12 and the mobile phone 8 perform communication using local area wireless communication technology such as Bluetooth, and a zone 16 which is a service provision area of several or several tens of meters is set using Bluetooth. If a subscriber having the mobile phone 8 enters into the area set by the access point 12, the access point 12 and the mobile phone 8 try to make communication so that it is recognized that the mobile phone 8 is located in a call area via the access point 12. As such, if the subscriber sets the mobile phone 8 in a call mode, the mobile phone 8 tries to make a call not via the mobile phone system but via the access point 12. As a result, the access point 12 tries an interworking between the mobile phone 8 and the wired phone network 10. If the interworking between the mobile phone 8 and the wired phone network 10 is carried out, the mobile phone 8 is used like a portable set of a home wired phone 14. Furthermore, since the subscriber does not use the mobile phone system, the subscriber can make a call at lower wired phone fees than mobile phone fees. In the DU phone service, the service provision area 16 can be more accurately set than local discount in the above-described mobile phone system. Thus, since there is a small variation in the DU phone service, a better local discount service can be provided.

However, in the DU phone service, a subscriber occupies a wired phone line during a call like in the wired phone 14. In the above-described mobile phone service, the radius of the cell 2 is varied regularly and a negative effect thereby exists. However, although a plurality of subscribers exist in the service provision area, each call is reopened for service so that the subscriber can make a call. On the other hands, in the DU phone service, when only one line is installed, if one subscriber occupies a line, another subscriber should use a mobile phone service even in a discount area. To overcome the drawback, an increase in the number of lines of the access point 12 may be considered. However, in this case, a new problem that enormous costs for installing lines should be paid occurs.

Meanwhile, a case where providing a specific service such as discounting fees is provided in a specific area set by mobile communication service providers has been increased. In this case, a method of providing a service by installing a device for setting a service zone so as to set a specific area and setting a radius of a predetermined distance from the device for setting a service zone as the specific area has been used. However, in this case, a global positioning system (GPS) should be used to check the location of the device for setting a service zone. However, at the present, a module using a location information system is expensive, which causes an increase in costs of a mobile communication unit.

DISCLOSURE OF THE INVENTION

The present invention provides a device for setting a service zone in a mobile communication network so that an effective zone-based service can be provided in the mobile communication network, a method and a system for providing a zone-based service using the device, and a mobile communication unit for providing the zone-based service.

According to an aspect of the present invention, there is provided a device for setting a service zone for a predetermined zone-based service provided by a mobile communication system in at least one mobile communication unit to which a mobile communication service is provided by the mobile communication system, the device comprising a local area wireless communication unit, wherein the local area wireless communication unit performs local area wireless communication with the mobile communication unit and the device sets a range in which the local area wireless communication is available as the service zone of the mobile communication unit.

The device may further comprise a moving preventing unit for preventing the service zone from being arbitrarily changed after the zone-based service is registered. The moving preventing unit may comprises: a moving sensor for sensing a moving degree by setting a state where a location installed when the zone-based service is registered as an initial state and for converting the moving degree into a moving distance and for accumulating the converted moving distance; and a controller, if the accumulated moving distance of the moving sensor exceeds a predetermined threshold value, for setting zone setting device status information which is referred to when a zone-based service is tried to connect the mobile communication system and in which whether the zone-based service connection is available is determined to a connection unavailable state due to the exceeded moving distance.

According to another aspect of the present invention, there is provided a system for providing a zone-based service comprising: a mobile communication system for providing a mobile communication service including a predetermined zone-based service to a subscriber using a mobile communication unit; a mobile communication unit for making communication with the mobile communication system using a mobile communication element, for making communication with a device for setting a service zone using a local area wireless communication unit and for connecting the predetermined zone-based service provided by the mobile communication system within a predetermined region using the device for setting a service zone; and a device for setting a service zone for performing local area wireless communication with the mobile communication unit using the local area wireless communication unit and for setting a range in which the local area wireless communication is available as the service zone of the mobile communication unit.

According to another aspect of the present invention, there is provided a method of providing a zone-based service in a mobile communication system for providing a mobile communication service including a predetermined zone-based service to a subscriber via a mobile communication unit, the method comprising setting a range of a device for setting a service zone for performing local area wireless communication with the mobile communication unit in which the local area wireless communication is available, as the service zone and providing the zone-based service to the mobile communication unit located in the service zone.

According to another aspect of the present invention, there is provided a mobile communication unit comprising: a local area wireless communication element for performing local area wireless communication with a device for setting a service zone, the device setting a service zone in which a predetermined zone-based service provided by a mobile communication system is available to an own local area wireless communication available range; a mobile communication element for performing communication with the mobile communication system; a memory in which a program for zone service registration between the device for setting a service zone and the mobile communication system and a program for zone service connection are stored; and a controller for periodically performing a procedure of requesting the device for setting a service zone of zone setting device status information, receiving the zone setting device status information and checking whether the zone-based service is available if a predetermined preparatory operation for trying an outbound call by a subscriber is sensed after performing control for zone service registration between the device for setting a service zone and the mobile communication system according to a zone service registration request by the subscriber and when it is sensed that a try of an outbound call is made by the subscriber and if it is checked that the zone-based service is available in the procedure, performing zone service-based outbound call processing.

BRIEF DESCRIPTION OF THE DRAWINGS

The above and other features and advantages of the present invention will become more apparent by describing in detail exemplary embodiments thereof with reference to the attached drawings in which:

FIG. 1 illustrates a cell and a zone of a conventional mobile phone system;

FIGS. 2A and 2B respectively illustrate cells formed in various shapes in the conventional mobile phone system;

FIGS. 3A and 3B respectively illustrate a cell of which radius is reduced or distorted;

FIG. 4 is a schematic view of a structure of a conventional DU phone service system;

FIG. 14 illustrates a procedure of processing a zone service-based outbound call when an outbound call is tried in a mobile communication unit according to another embodiment of the present invention.

BEST MODE FOR CARRYING OUT THE INVENTION

The present invention will now be described in greater detail with reference to the accompanying drawings, in which exemplary embodiments of the invention are shown.

Figure 5:
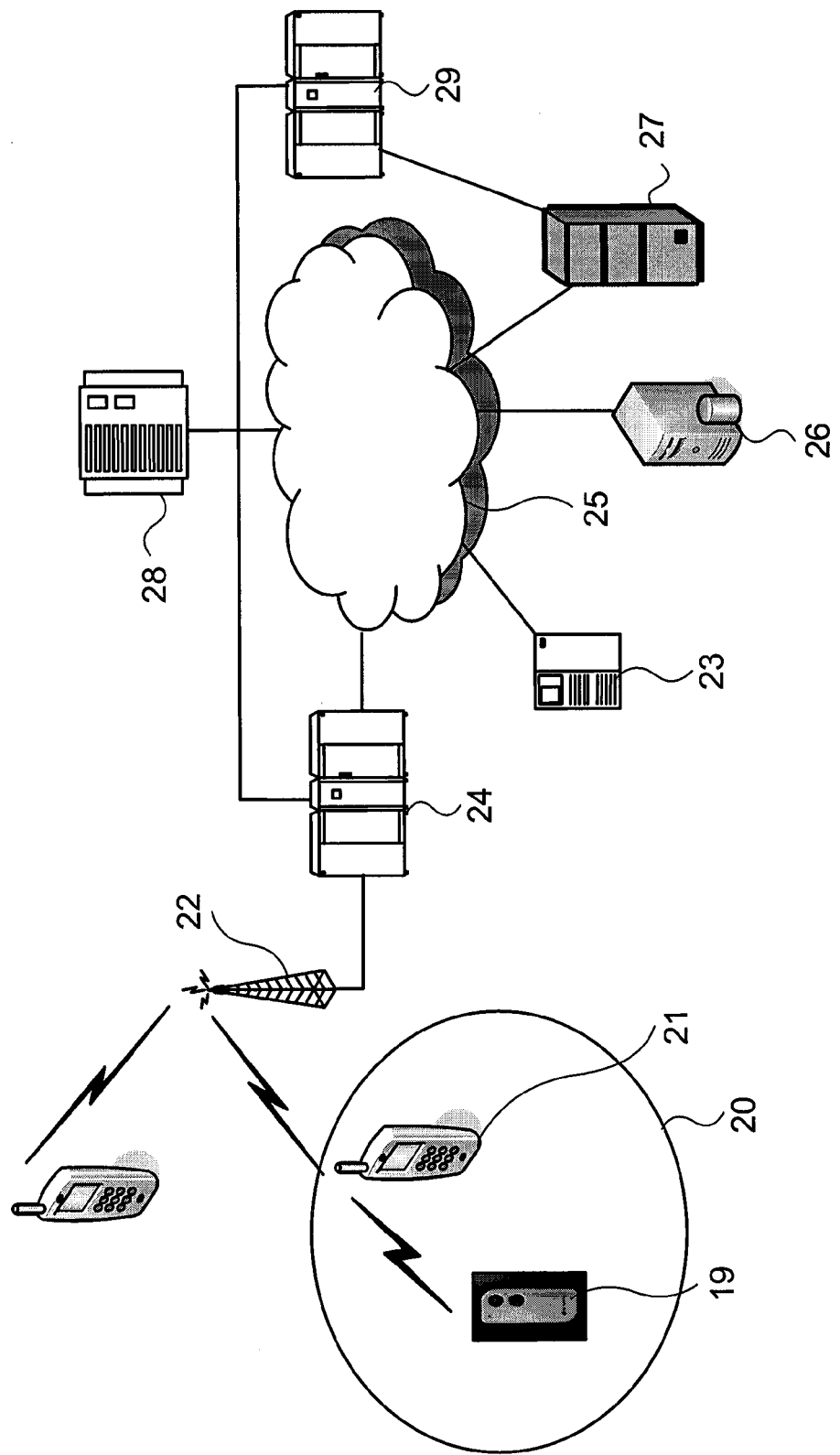
FIG. 5 illustrates a system for providing a zone-based service in a mobile communication network according to an embodiment of the present invention.

FIG. 5 illustrates a system for providing a zone-based service in a mobile communication network according to an embodiment of the present invention. Referring to FIG. 5, the system for providing a zone-based service includes a device 19 for setting a service zone, a mobile communication unit 21, a mobile communication network system, a zone-based service authentication server 27, a zone-based service subscriber database server 26, and an accounting server 29.

The mobile communication network system has a general construction comprised of a base station 22 that communicates with the mobile communication unit 21, a mobile communication exchanger 24 and a home location register 23 which are connected to a signal network 25 such as a network No. 7, and a message service center 28.

The device 19 for setting a service zone sets a service zone to which a specific service is provided. In the mobile communication unit 21, voice communication (that is, a telephone conversation) and data communication (for example, wireless Internet) can be performed. The mobile communication unit 21 can check whether it is located in the service zone by communication with the device 19 for setting a service zone. If the mobile communication unit 21 is location in the service zone, a specific service can be provided to the mobile communication unit 21.

The zone-based service subscriber database server 26 makes, as zone-based service subscriber information, subscriber's mobile communication unit information (for example, the number of a unit), Zone Setting Device Identification (ZSDID), service registration information of a mobile communication unit (information indicating whether a service is registered or not, for example, if "1", registered, and if "0", unregistered) and service zone setting information (for example, "1" indicates that the mobile communication unit 21 is located in a service zone and the device 19 for setting a service zone normally operates, and "0" indicates that the mobile communication unit 21 is located outside the service zone or the device 19 for setting a service zone does not normally operate) as a database and manages it. Mobile communication unit information and zone-based service subscriber information such as ZSDID is registered by a mobile communication network service provider when the subscriber purchases the device 19 for setting a service zone so as to receive a zone-based service using the mobile communication unit 21. Alternatively, after the subscriber purchases the device 19 for setting a service zone, the subscriber can has access to the Internet homepage of the mobile communication network service provider through the Internet using the mobile communication unit 21 and register the mobile communication unit information and the zone-based service subscriber information such as ZSDID etc. At this time, the registered information is basic zone-based service subscriber information. When service registering of the mobile communication unit that will be described later is requested, the zone-based service subscriber database server 26 further makes service registration information as zone-based service subscriber information about a corresponding mobile communication unit as a database and manages it. In addition, when an outbound call is tried from the mobile communication unit of which service is registered, the zone-based service subscriber database server 26 further makes service zone setting information (for example, "1" indicates that the mobile communication unit 21 is located in the service zone and the device 19 for setting a service zone normally operates and "0" indicates that the mobile communication unit 21 is located outside the service zone or the device 19 for setting a service zone does not normally operate) as zone-based service subscriber information as a database and manages it.

The zone-based service authentication server 27 performs a procedure of registering a zone-based service and a procedure of canceling a service according to a request of the mobile communication unit 21. The zone-based service authentication server 27 checks whether the ZSDID transmitted from the mobile communication unit when registration of zone-based service is requested from the mobile communication unit and the mobile communication unit information are managed by the zone-based service subscriber database server 26 and if they are managed by the zone-based service subscriber database server 26, the zone-based service authentication server 27 notifies a corresponding mobile communication unit that registration of the zone-based service is successful. The zone-based service authentication server 27 requests to delete all service subscriber information corresponding to the ZSDID transmitted from the mobile communication unit when canceling of the zone-based service is requested from the mobile communication unit and the mobile communication unit information from the database.

The accounting server 29 performs accounting according to the contents of communication service usage of the mobile communication unit 21. When the zone-based service is a fee discount service, the accounting server 29 determines whether a corresponding communication fee is discounted based on the service zone setting information transmitted whenever the accounting server 29 has access to communication (voice communication or data communication) from the mobile communication unit 21.

Figure 6:
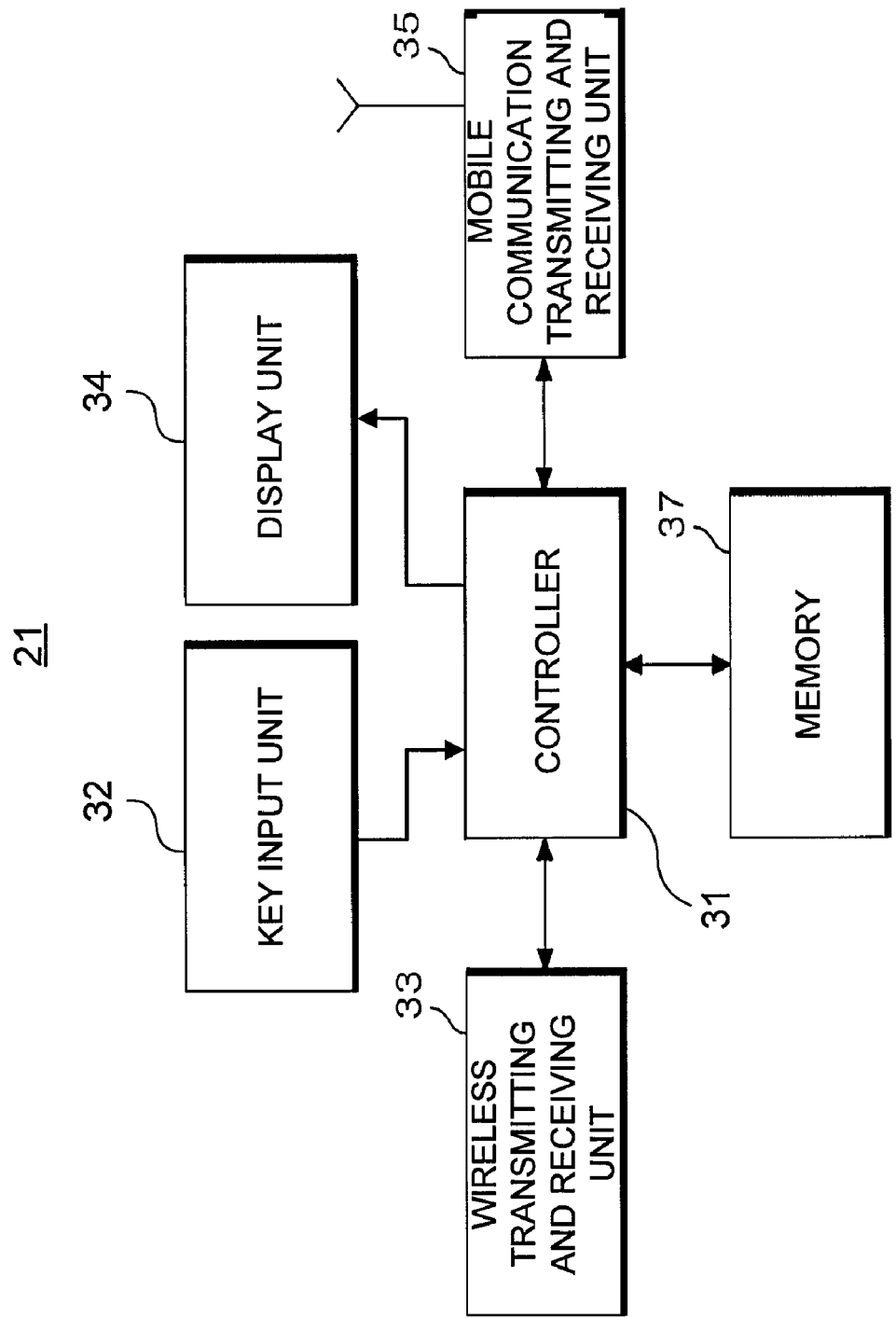
FIG. 6 illustrates a mobile communication unit illustrated in FIG. 5 according to an embodiment of the present invention.

FIG. 6 illustrates a mobile communication unit illustrated in FIG. 5 according to an embodiment of the present invention. Referring to FIG. 6, the mobile communication unit 19 includes a controller 31, a key input unit 32, a wireless transmitting and receiving unit 33, a display unit 34, a mobile communication transmitting and receiving unit 35, and a memory 37.

The key inputting unit 32 includes input keys for inputting numbers and characters by a subscriber and function keys for selecting functions.

The wireless transmitting and receiving unit 33 performs communication with the device 19 for setting a service zone. The wireless transmitting and receiving unit 33 may include local area wireless communication modules such as Bluetooth, InfraRed (IR), ZigBee, or Radio Frequency Identification (RFID). Here, when the wireless transmitting and receiving unit 33 is a Bluetooth communication module, the Bluetooth communication module constitutes a wireless channel using a Bluetooth mode so as to communicate with the device 19 for setting a service zone.

The Bluetooth communication module communicates with the device 19 for setting a service zone using industrial scientific medical (ISM) band of 2.4 GHz and prevents interference with another device by setting a guard band of 2 MHz under the ISM band and a guard band of 3.5 MHz on the ISM band. In addition, the Bluetooth module basically performs hopping 1600 times per second using a frequency hopping manner. The output of the Bluetooth module is 100 mW (20 dBm). The Bluetooth module named to class 1 is characterized in that it can communicate with the device 19 for setting a service zone in a maximum range of 100 m.

Both the wireless transmitting and receiving unit 33 of the mobile communication unit 21 and the wireless transmitting and receiving unit 41 of the device 19 for setting a service zone have been described using a Bluetooth mode. However, it will be understood by a person skilled in the art that the present invention is not limited thereto.

The display unit 34 includes a liquid crystal display (LCD), for example. The display unit 34 displays characters and numbers according to control of the controller 31 or displays a function menu screen and further displays texts and images etc.

The mobile communication transmitting and receiving unit 35 transmits and receives voice and data to and from the mobile communication network system. The mobile communication transmitting and receiving unit 35 can constitute a communication channel using one method of code division multiple access (CDMA), frequency division multiple access (FDMA), time division multiple access (TDMA), wideband code division multiple access (WCDMA), and wireless broadband Internet (WBI), for example. The mobile communication transmitting and receiving unit 35 may constitute a communication channel using CDMA which has been most widely used, in consideration of economies. The mobile communication transmitting and receiving unit 35 constitutes a traffic channel for transmitting and receiving a voice signal to and from the mobile communication unit 21 and the base station 22, a data channel for transmitting and receiving data, and a paging channel for checking the mobile communication unit 21 or for transmitting and receiving a short message service (SMS) and a multi message service (MMS).

Programs for controlling a general operation of the mobile communication unit 21 are stored in the memory 37. In addition, program and data for setting a service zone according to the present invention are stored in the memory 37. Data generated while the programs are executed are temporarily stored in the memory 37.

In particular, the memory 37 stores information needed to set a service zone in a nonvolatile memory unit. Here, the information may include authentication server registration status information, service registration status information, ZSDID, temporary registration status information TMP_FLAG, intrinsic name information of a device for setting a service zone, link key information, zone setting device status information, and RF data link identification information RF_DLCI.

The authentication server registration status information is information that indicates whether the mobile communication unit registers the device for setting a service zone in the zone-based service authentication server 27. For example, if the mobile communication unit registers the device for setting a service zone in the zone-based service authentication server 27, the authentication server registration status information can be set to "0x01", if the mobile communication unit does not register the device for setting a service zone in the zone-based service authentication server 27, the authentication server registration status information can be set to "0x00", and an initial value thereof can be set to "0x00".

The ZSDID is intrinsic identification information of 48 bit, for example, assigned to the device for setting a service zone. The ZSDID is provided by the device for setting a service zone by setting an inquiry link in the device 19 for setting a service zone. The ZSDID is used when the mobile communication unit 21 that has joined a service zone policy discriminates the device 19 for setting a service zone installed by the subscriber when subscribing. In addition, since the mobile communication unit 21 designates one or more zones and has one or more ZSDID accordingly, a space for storing one or more ZSDID may be assigned to the memory 37.

The temporary registration status information TMP_FLAG is 1-bit flag information indicating that the mobile communication unit registers a service in the zone-based service authentication server 27 in a procedure of registering a zone-based service. An initial value of the temporary registration status information TMP_FLAG is "0" and if the mobile communication unit registers a service in the zone-based service authentication server 27, an initial value thereof is "1". Here, the temporary registration status information TMP_FLAG is stored in the memory 37 because the mobile communication unit completes registration of a service in the zone-based service authentication server 27 that requires longer time during the procedure of registering a zone-based service, for example, if the procedure of registering a zone-based service is terminated due to reasons that a battery power is off and when the procedure of registering a zone-based service is repeatedly performed, the procedure of registering a service in the zone-based service authentication server 27 can be omitted.

The intrinsic name information of the device for setting a service zone is used when the device for setting a service zone and the mobile communication unit communicate using a Bluetooth mode. The intrinsic name information of the device for setting a service zone is an intrinsic name value set in a class of device/service (COD) region when manufacturing with respect to the device for setting a service zone and is obtained from the device for setting a service zone. The intrinsic name information of the device for setting a service zone is used to filter a signal message from another peripheral Bluetooth device when the mobile communication unit sets an inquiry link. When the mobile communication unit 21 has the maximum number, two ZSDID, a space in which two names are to be stored is assigned to the memory 110. An initial value of the memory 110 can be set to "LGT_DMID1" and "LGT_DMID2", for example.

The link key information is information in which ZSDID and a zone setting device pin code PINCODE are exchanged and matched using the device for setting a service zone in the mobile communication unit.

The zone setting device status information is status code information of a "zone setting device status response message" recently transmitted from the device for setting a service zone. A type of the status code information of the "zone setting device status response message can be classified into a "normal status" indicating that a zone-based service is available, a "setting value exceed moving status" indicating that a moving distance of the device for setting a service zone exceeds a setting value, a "hardware abnormal status" indicating that a hardware abnormal status of the device for setting a service zone, a "power defective status" indicating that a supply of power is stopped, and a "continuous reset try status" indicating that a continuous reset try occurs. The normal status can be set to "0x00000000" and statuses in which a zone-based service is unavailable can be set to other values.

The RF data link identification information RF_DLCI is data link identification information used when the mobile communication unit connects RF communication with the device 19 for setting a service zone using the wireless transmitting and receiving unit 33. If a service discovery protocol (SDP) is used whenever connecting the RF communication, the RF data link identification information RF_DLCI is unnecessary.

The controller 31 controls the mobile communication transmitting and receiving unit 35, the display unit 34, the key inputting unit 32, the wireless communication transmitting and receiving unit 33, and the memory 37 etc. of the mobile communication unit 31. In particular, the controller 31 performs control for service registration in the zone-based service authentication server 27 and control for service registration in the device 19 for setting a service zone when the subscriber selects zone service registration using the key inputting unit 32.

In addition, if a try of an outbound call by a subscriber is detected, the controller 31 requests the device 19 for setting a service zone of zone setting device status information and receives zone setting device status information in response to the request. If it is checked that the zone setting device status information is normal information in which a zone-based service is available, the controller 31 performs zone service-based (for example, a fee discount service and a free service) outbound call processing, and if it is checked that the zone setting device status information is not normal information in which a zone-based service is unavailable, the controller 31 performs control for performing general call processing. Here, the try of the outbound call is done by manipulation of a call key and a transmission key of the key inputting unit 32 or corresponding to key manipulation and may be predetermined. The try of the outbound call includes a key invent such as input of a predetermined key (for example, a number key) of the key inputting unit 32, backlight-turn-on of the display unit 34, folder-open in case of a folder type mobile communication unit, and slide-up in case of a slide type mobile communication unit.

In addition, if the status information of the device 19 for setting a service zone is received by communication with the device 19 for setting a service zone when an outbound call is tried and it is checked that the zone-based service is available, the controller 31 controls a zone-based service display having a shape in which a zone-based service is available, for example, an icon shape, to be displayed in a predetermined region of the display screen of the display unit 34.

Figure 7:
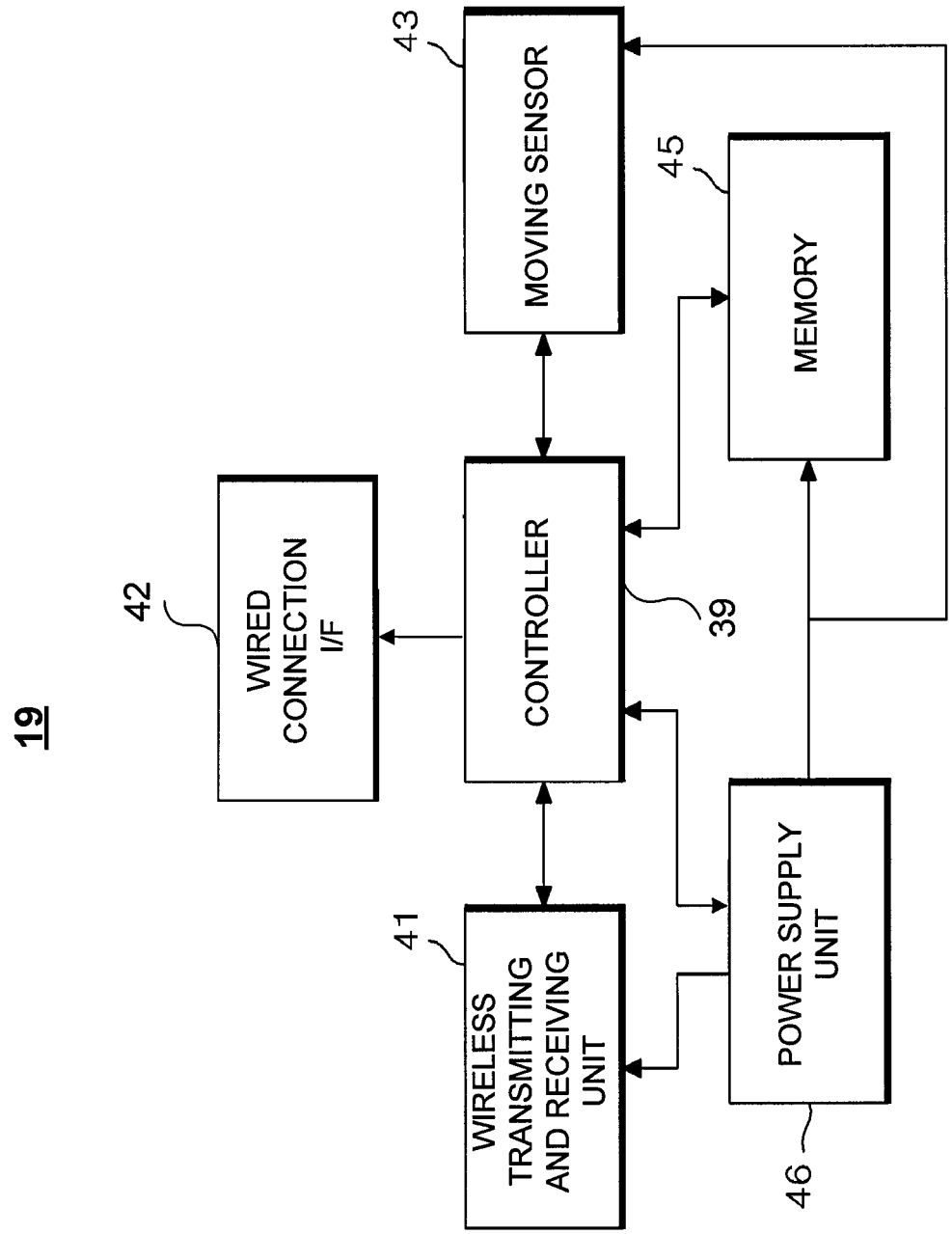
FIG. 7 illustrates a device for setting a service zone illustrated in FIG. 5 according to an embodiment of the present invention.
Figure 8A:
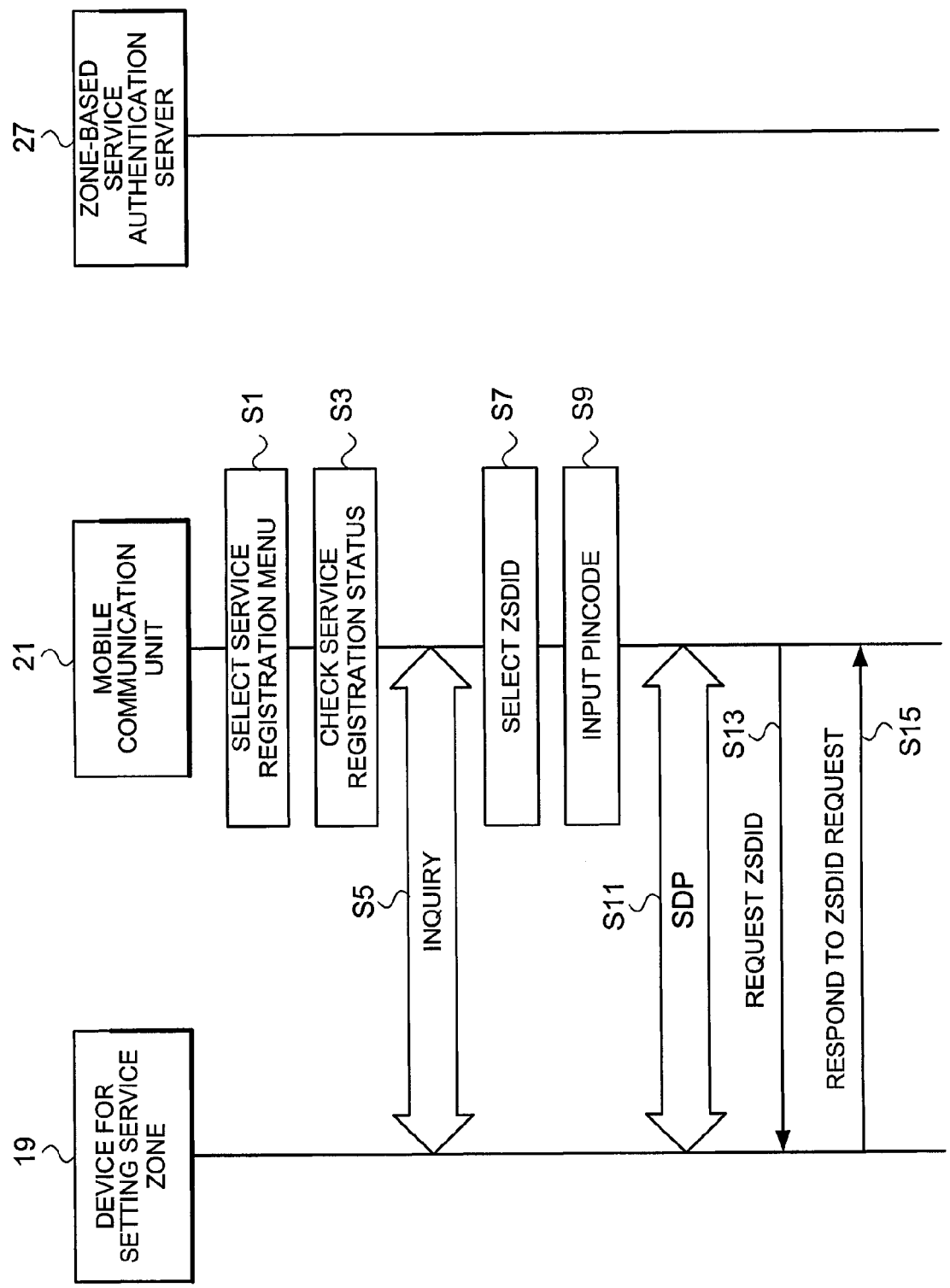
FIGS. 8A and 8B illustrate a procedure of registering a zone-based service for providing the zone-based service according to an embodiment of the present invention.
Figure 8B:
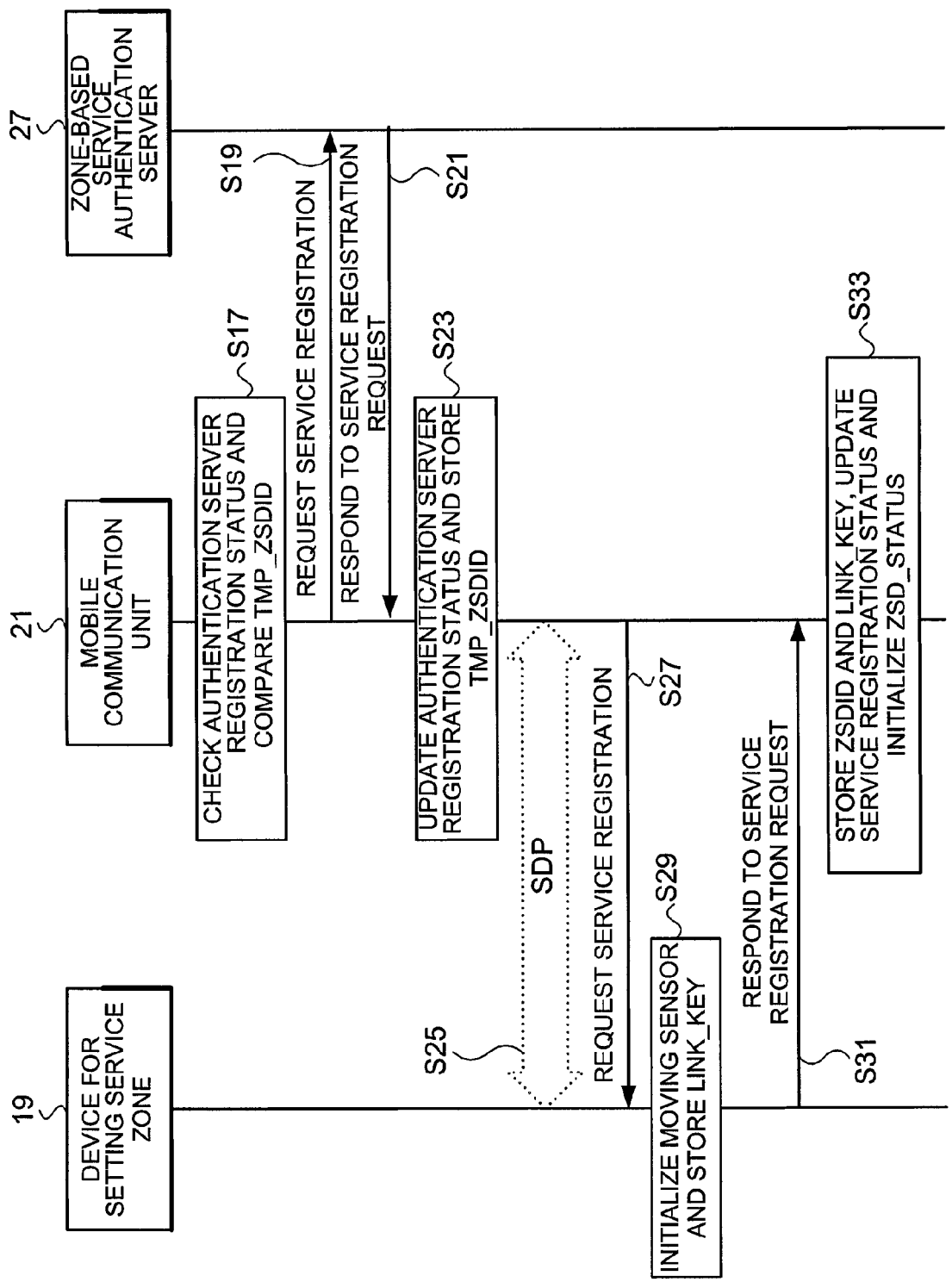

FIG. 7 illustrates a device for setting a service zone illustrated in FIG. 5 according to an embodiment of the present invention. Referring to FIG. 7, the device 19 for setting a service zone includes a controller 39, a wireless transmitting and receiving unit 41, a wired connection interface 42, a moving sensor 43, a memory 45, and a power supply unit 46.

The moving sensor 43 prevents the subscriber from changing the registered service zone after a service registration of the device 19 for setting a service zone is completed. If the device 19 for setting a service zone moves to a location formed when the service registration is completed, the moving sensor 43 senses a moving degree and calculates the moving degree by a moving distance. If an accumulation of the calculated moving distance exceeds a predetermined threshold value, the moving sensor 43 notifies the controller 39 that the moving distance exceeds the predetermined threshold value. The moving sensor 43 may be an acceleration sensor, for example.

The wireless transmitting and receiving unit 41 is used to perform local area wireless communication with the mobile communication unit 21. The wireless transmitting and receiving unit 41 may use communication modes such as Bluetooth, wireless local area network (WLAN), radio frequency identification (RFID), and ZigBee etc. In addition, when power class 1 is used as Bluetooth which is one communication mode, the wireless transmitting and receiving unit 41 communicates with the mobile communication unit using power class 1 at a maximum distance of 100 m, the radius of the service zone may be about 100 m. When Bluetooth is used, 7 mobile communication units can be registered in one device 19 for setting a service zone.

The wired connection interface 42 is used to make data communication with an external device using a data communication cable. Specifically, the wired connection interface 42 may be used when the subscriber upgrades embedded software through the wired connection interface 42 using new software of the device 19 for setting a service zone downloaded by connecting the Internet homepage of the mobile communication network service company through a personal computer etc. For example, a universal serial bus (USB) interface may be used as the wired connection interface 42.

The power supply unit 46 includes a charging battery and a charging device for converting alternating current (AC) power into direct current (DC) power and charging the charging battery. Even when external AC power is not applied to each component, power may be supplied to each component for a predetermined time (for example, 48 hours). In addition, the power supply unit 46 detects a state where the external AC power is not applied to each component (for example, cut-off of external AC power due to an electricity failure or a subscriber's intentional moving of the device 19 for setting a service zone) and transmits the detection result to the controller 39. In addition, the power supply unit 46 supplies power only to the moving sensor 43 in the state where the external AC power is not applied to each component so that, even when the subscriber cuts off the power of the device 19 for setting a service zone and moves the device 19 for setting a service zone, a moving distance can be accurately calculated. The power supply unit 46 may be a small dry cell.

Programs for controlling an operation of the device 19 for setting a service zone and data generated during the operation are stored in the memory 45. The memory 45 stores information needed to set a service zone in a nonvolatile memory unit.

Here, the information may include ZSDID, intrinsic name information of a device for setting a service zone, link key information, zone setting device status information, and RF data link identification information RF_DLCI.

The ZSDID is intrinsic identification information of 48 bit, for example. The ZSDID is used when the mobile communication unit 21 that has joined a service zone policy discriminates the device 19 for setting a service zone installed by the subscriber when subscribing.

The intrinsic name information of the device for setting a service zone is used when the device for setting a service zone and the mobile communication unit communicate using a Bluetooth mode. The intrinsic name information of the device for setting a service zone is an intrinsic name value set in a class of device/service (COD) region when manufacturing. The link key information is information in which ZSDID and a zone setting device pin code PINCODE are exchanged and matched using the device for setting a service zone in the mobile communication unit.

The zone setting device status information is the last status code information. A type of the zone setting device status code information can be classified into a "normal status" indicating that a zone-based service is available, a "setting value exceed moving status" indicating that a moving distance of the device for setting a service zone exceeds a setting value, a "hardware abnormal status" indicating that a hardware abnormal status of the device for setting a service zone, a "power defective status" indicating that a supply of power is stopped, and a "continuous reset try status" indicating that a continuous reset try occurs. The normal status can be set to "0x00000000" and statuses in which a zone-based service is unavailable can be set to other values.

The RF data link identification information RF_DLCI is data link identification information used when the mobile communication unit connects RF communication with the device 19 for setting a service zone. If a service discovery protocol (SDP) is used whenever connecting the RF communication, the RF data link identification information RF_DLCI is unnecessary.

The controller 39 controls the wireless transmitting and receiving unit 41, the moving sensor 43, the power supply unit 46, the wired connection interface 42, and the memory 45. In particular, the controller 39 performs control for transmitting the ZSDID to the mobile communication unit 21 according to a procedure of registering a service of the mobile communication unit 31 and control for service registration in response to a request for service registration of the mobile communication unit 21.

In addition, the controller 39 monitors in a real time whether the zone-based service is available or whether the moving distance of the device for setting a service zone exceeds a predetermined value or whether the hardware of the device for setting a service zone is abnormal or whether a supply of power has been stopped or whether a continuous reset try is generated. The controller 39 stores and manages the monitoring result as zone setting device status information in the memory 45.

In addition, the controller 39 performs control for transmitting the zone setting device status information stored in the memory 45 to the corresponding mobile communication unit 21 in the response of a zone setting device status information request from the mobile communication unit 21 when an outbound call of the mobile communication unit 21 is tried.

A procedure of registering a zone-based service for providing a zone-based service according to an exemplary embodiment of the present invention will now be described in greater detail with reference to FIGS. 8A, 8B, 9, and 10. First, referring to FIG. 8A, when the subscriber selects a user menu using the key inputting unit 32 of the mobile communication unit 21, sees a menu screen (see M1 of FIG. 9 and M11 of FIG. 10) displayed on the display unit 34 by control of the controller 31 and selects the zone-based service using the key inputting unit 32, a zone-based service menu screen (see M2 of FIG. 9 and M12 of FIG. 10) displayed on the display unit 34 by control of the controller 31 is displayed. At this time, a user selects service registration using the key inputting unit 32 (step S1).

As such, the controller 31 of the mobile communication unit 21 inspects service registration status information stored in the memory 37 and checks whether the mobile communication unit 31 has been already registered for service in the device 19 for setting a service zone (step S3).

Figure 9:
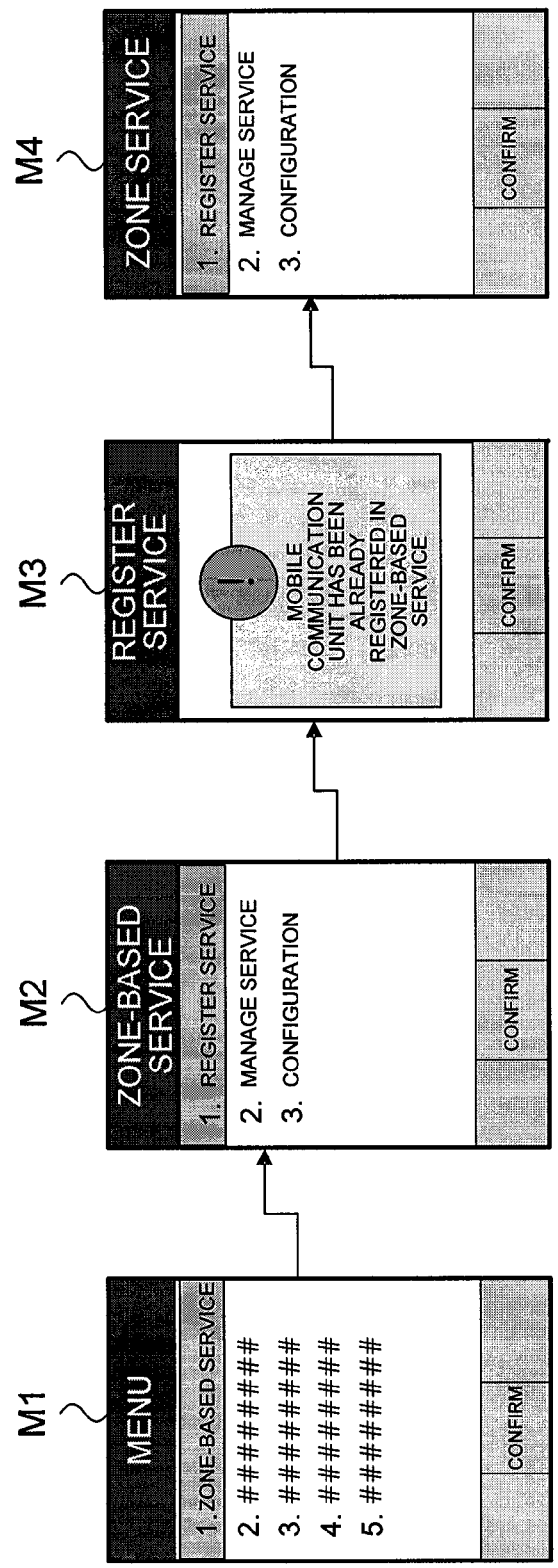
FIGS. 9 and 10 illustrate an example of a configuration of a screen displayed on a display unit while the procedure for registering a zone-based service is performed in the mobile communication unit illustrated in FIG. 6.

If it is determined in step S3 that service registration has not been made, the controller 31 controls the display unit 34, as illustrated by M3 of FIG. 9, guides that the mobile communication unit 21 has been already registered in the zone-based service and terminates the service registration procedure.

If it is determined in step S3 that service registration has been already made, the controller 31 controls the wireless transmitting and receiving unit 33 so as to search the device 19 for setting a service zone and sets a peripheral Bluetooth device and a Bluetooth inquiry link (step S5).

Figure 10:
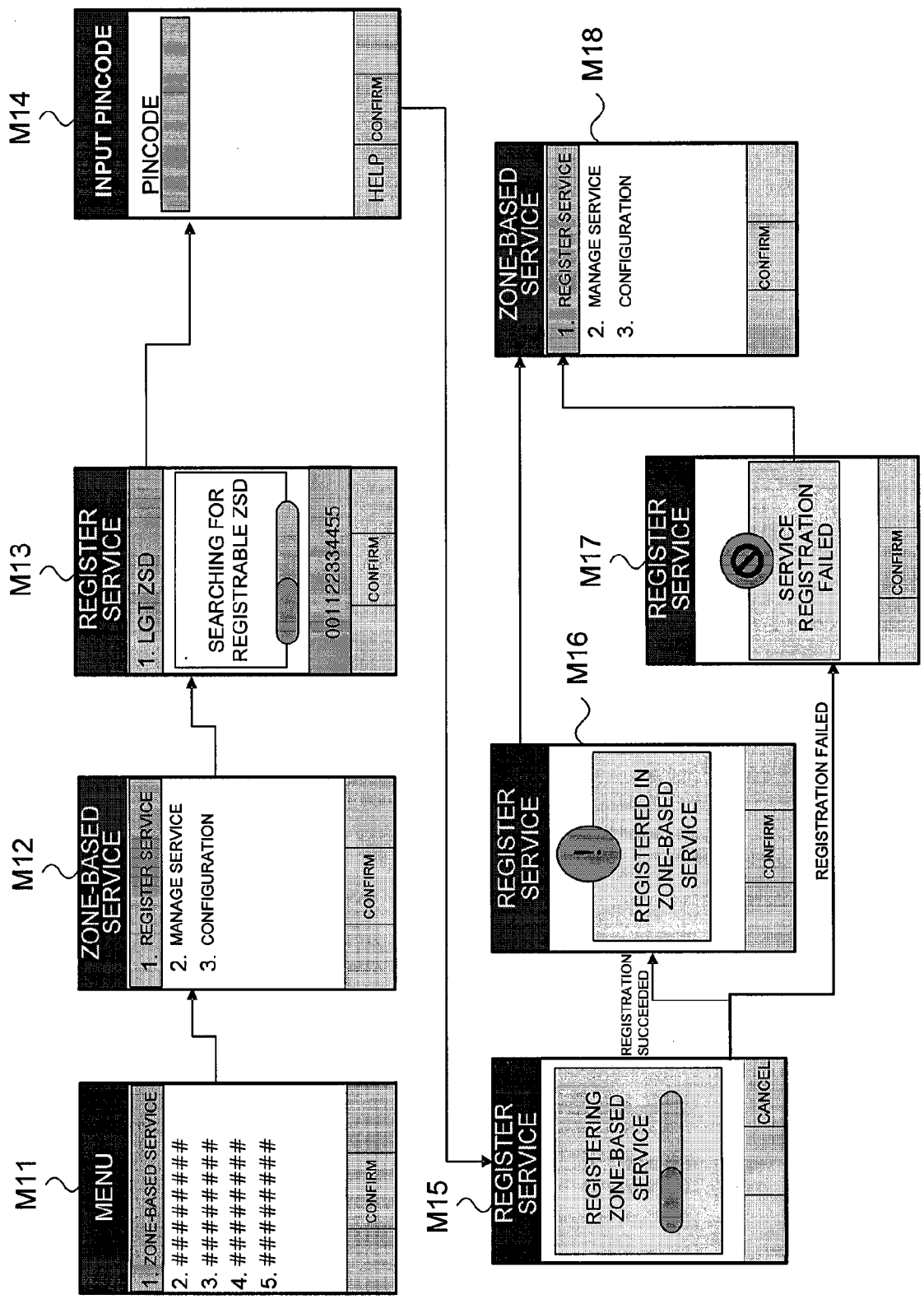

As a result, as the wireless transmitting and receiving unit 33 of the mobile communication unit 21 set to an inquiry line with the device 19 for setting a service zone and receives ZSDID from the device 19 for setting a service zone, the controller 31 controls the display unit 34 so that the ZSDID can be displayed together with the zone setting device identification information search screen, as illustrated by M13 of FIG. 10.

After that, as the subscriber selects the ZSDID using the key inputting unit 32, the controller 31 controls the display unit 34 so that a pin code input screen of the device 19 for setting a service zone can be displayed, as illustrated by M14 of FIG. 10. Subsequently, the subscriber inputs a pin code marked on the appearance of the device 19 for setting a service zone using the key inputting unit 32 (steps S7 and S9).

Subsequently, the controller 31 of the mobile communication unit 21 controls the wireless transmitting and receiving unit 33 by inputting the pin code to set the wireless transmitting and receiving unit 41 of the device 19 for setting a service zone and a service discovery protocol (SDP) (step S11) and requests the ZSDID through the wireless transmitting and receiving unit 33 (step S13). At this time, the controller 31 controls the display unit 34 so that the zone service registering procedure is in progress, as illustrated by M15 of FIG. 10.

After that, the controller 39 of the device 19 for setting a service zone that receives a request of the ZSDID through the wireless transmitting and receiving unit 41 reads own identification code ZSDID stored in the memory 45 and controls the wireless transmitting and receiving unit 41 to transmit the ZSDID to the mobile communication unit 21 in the response of the ZSDID (step S15).

Subsequently, the controller 31 of the mobile communication unit 21 that receives a response of the ZSDID through the wireless transmitting and receiving unit 33 inspects authentication server registration status information stored in the memory 37 and arbitrary registration status information TMP_FLAG and checks whether service registration has been already made in the zone-based service authentication server 27 (step S17). Here, if the service registration has been completed in the zone-based service authentication server 27, the authentication server registration status information is set to "0x01", for example, and the temporary registration status information is set to "1", for example.

If it is checked in step S17 that the service registration has not been made in the zone-based service authentication server 27, the controller 31 of the mobile communication unit 21 controls the mobile communication transmitting and receiving unit 35 and transmits a short message having a teleservice identifier (TID) for notifying a service registration request to the zone-based service authentication server 27 through a traffic channel (in step S19). Here, the identification information ZSDID of the device 19 for setting a service zone and information of the mobile communication unit 21 are included in the service registration request short message.

After that, the zone-based service authentication server 27 inquires whether the ZSDID of the device 19 for setting a service zone transmitted from the mobile communication unit 21 and the mobile communication unit information are managed by the zone service subscriber database server 26. If the ZSDID and the mobile communication unit information are managed by the zone service subscriber database server 26, the zone-based service authentication server 27 sends a short message having a TID indicating that zone service registration in the corresponding mobile communication unit 21 has been successfully made, in response of a service registration request. If the ZSDID and the mobile communication unit information are not managed by the zone service subscriber database server 26, the zone-based service authentication server 27 sends the short message having a TID indicating that zone service registration in the corresponding mobile communication unit 21 has failed, in response of the service registration request (step S21). As such, if it is checked that the response of the service registration request received through the mobile communication transmitting and receiving unit 35 has failed, the controller 31 of the mobile communication unit 21 controls the display unit 34 and displays that service registration has failed, as illustrated by M17 of FIG. 10. After that, the controller 31 of the mobile communication unit 21 terminates a service registration procedure.

If it is checked that the zone service registration has been successfully made in response of the service registration request, the controller 31 of the mobile communication unit 21 updates and stores the authentication server registration status information stored in the memory 37 as "0x01", for example, and updates and stores temporary registration status information TMP_FLAG as "1", for example (step S23).

After that, the controller 31 of the mobile communication unit 21 controls the wireless transmitting and receiving unit 33 to set a service discovery protocol (SDP) with the wireless transmitting and receiving unit 41 of the device 19 for setting a service zone (step S25) and requests service registration through the wireless transmitting and receiving unit 33 (step S27). Here, the above-described step S25 may be omitted.

As such, the controller 39 of the device 19 for setting a service zone that has received the service registration request through the wireless transmitting and receiving unit 41 controls the wireless transmitting and receiving unit 41 to initialize the moving sensor 43 and stores a link key (step S29).

Subsequently, the controller 39 of the device 19 for setting a service zone controls the wireless transmitting and receiving unit 41 to transmit the service registration request response to the mobile communication unit 21 (step S31).

As such, the controller 31 of the mobile communication unit 21 that has received the service registration request response controls the wireless transmitting and receiving unit 41 to store the ZSDID of the device 19 for setting a service zone and the link key in the memory 45, to update and store the service registration status information as "0x01", for example, and to initialize zone setting device status information ZSD_STATUS (step S33). Simultaneously, the controller 31 of the mobile communication unit 21 controls the display unit 34 to indicate that service registration has been successfully made, as illustrated by M16 of FIG. 10.

If it is checked in step S17 that service registration has been made in the zone-based service authentication service 27, the controller 31 of the mobile communication unit 21 controls the wireless transmitting and receiving unit 41 to determine that the service registration procedure is terminated for abnormal reasons in a state where the service registration in the authentication server has been complete and to omit steps S19 and S21 and to perform a procedure after step S23.

A procedure of processing a zone service-based outbound call when an outbound call is tried in a mobile communication unit according to an embodiment of the present invention will now be described in greater detail with reference to FIGS. 11 and 13.

A subscriber selects connection of a call such as a voice call and a data call etc. using the key inputting unit 32 of the mobile communication unit 21, for example, by manipulating a "call key" (step S41). Here, for example, as the subscriber manipulates the input key of the key inputting unit 32, the controller 31 of the mobile communication unit 21 controls the display unit 34 to display a screen indicated by M12 of FIG. 13, for example.

As such, the controller 31 of the mobile communication unit 21 controls the wireless transmitting and receiving unit 33 to set an SDP with the wireless transmitting and receiving unit 41 of the device 19 for setting a service zone (step S43). Here, step S43 may be omitted. After that, the controller 31 of the mobile communication unit 21 controls the wireless transmitting and receiving unit 33 to transmit a request of the ZSD status information of the device 19 for setting a service zone (step S45).

As such, the controller 39 of the device 19 for setting a service zone that has received the request of the ZSD status information through the wireless transmitting and receiving unit 41 controls the wireless transmitting and receiving unit 41 to read the status information stored in the memory 45 and to transmit the status information to the mobile communication unit 21 as a ZSD status information response (step S47).

Here, the ZSD status information is included in the ZSD status information response. A type of the ZSD status information can be classified into a "normal status" indicating that a zone-based service is available, a "setting value exceed moving status" indicating that a moving distance of the device for setting a service zone exceeds a setting value, a "hardware abnormal status" indicating that a hardware abnormal status of the device for setting a service zone, a "power defective status" indicating that a supply of power is stopped, and a "continuous reset try status" indicating that a continuous reset try occurs.

If the device 19 for setting a service zone is in the "normal status", the ZSD status information is "0x00000000", for example. If the device 19 for setting a service zone is in the "setting value exceed moving status", the ZSD status information is "0x00000001", for example. If the device 19 for setting a service zone is in the "hardware abnormal status", the ZSD status information is "0x00000008", for example. If the device 19 for setting a service zone is in the "power defective status", the ZSD status information is "0x00000010", for example. If the device 19 for setting a service zone is in the "continuous reset try status", the ZSD status information is "0x00000040", for example.

If it is checked that the ZSD status information is in the normal state, the controller 31 of the mobile communication unit 21 that has received the ZSD status information response in which the ZSD status information is included controls the memory 37 to store the ZSD status information in the memory 37 (step S49). The controller 31 of the mobile communication unit 21 controls the display unit 34 to display that a zone-based service area is displayed as a character and/or zone service identifier (ZSI), as illustrated by M14 of FIG. 13 (step S51).

Here, the ZSI may be at least one or more ZSI selected from a character, a figure, and an icon.

After that, the controller 31 of the mobile communication unit 21 controls the mobile communication transmitting and receiving unit 35 to perform a try of call connection to the mobile communication exchanger 24 via the base station 22. In addition, the controller 31 of the mobile communication unit 21 sets service zone setting information indicating that the mobile communication unit 21 is located in the service zone using 1 bit of an outbound call message and the device 19 for setting a service zone indicates a normal operation status, for example, "1", and transmits the service zone setting information to the mobile communication exchanger 24 (step S53). That is, the controller 31 of the mobile communication unit 21 performs zone service-based call connection.

As a result, the service zone setting information is transmitted to the zone service subscriber database server 26 using the mobile communication exchanger 24 and is made as a database and stored. For example, if the zone service is a service related to accounting such as a fee discount service or a free service etc., the service zone setting information managed by the zone service subscriber database server 26 when accounting is processed by the accounting server 19 is referred to and reflected.

If it is checked in step S47 that the ZSD status information is not in the normal state, the controller 31 of the mobile communication unit 21 that has received ZSD status information response controls the mobile communication transmitting and receiving unit 35 to store the ZSD status information in the memory 37 (step S49) and the controls the display unit 34 not to display that the zone-based service is unavailable (step S51).

After that, the controller 31 of the mobile communication unit 21 controls the mobile communication transmitting and receiving unit 35 to perform a try of call connection to the mobile communication exchanger 24 via the base station 22. In addition, the controller 31 of the mobile communication unit 21 sets service zone setting information indicating that the mobile communication unit 21 is located in the service zone using 1 bit of an outbound call message and the device 19 for setting a service zone indicates a normal operation status, for example, "0", and transmits the service zone setting information to the mobile communication exchanger 24 (step S53). That is, the controller 31 of the mobile communication unit 21 performs general call connection.

When the ZSD status information response of step S47 is not received, the controller 31 of the mobile communication unit 21 repeatedly performs the above-described step S45. Even in this case, if the ZSD status information status is not received, the controller 31 of the mobile communication unit 21 determines that the current area is not the zone service-based area and displays that the current area is an area in which the zone-based service is not possible, as illustrated by M15 of FIG. 13, for example.

After that, the controller 31 of the mobile communication unit 21 controls the mobile communication transmitting and receiving unit 35 to perform a try of call connection to the mobile communication exchanger 24 via the base station 22. In addition, the controller 31 of the mobile communication unit 21 sets service zone setting information indicating that the mobile communication unit 21 is located in the service zone using 1 bit of an outbound call message and the device 19 for setting a service zone indicates a normal operation status, for example, "0", and transmits the service zone setting information to the mobile communication exchanger 24 (step S51). That is, the controller 31 of the mobile communication unit 21 performs general call connection.

Figure 12:
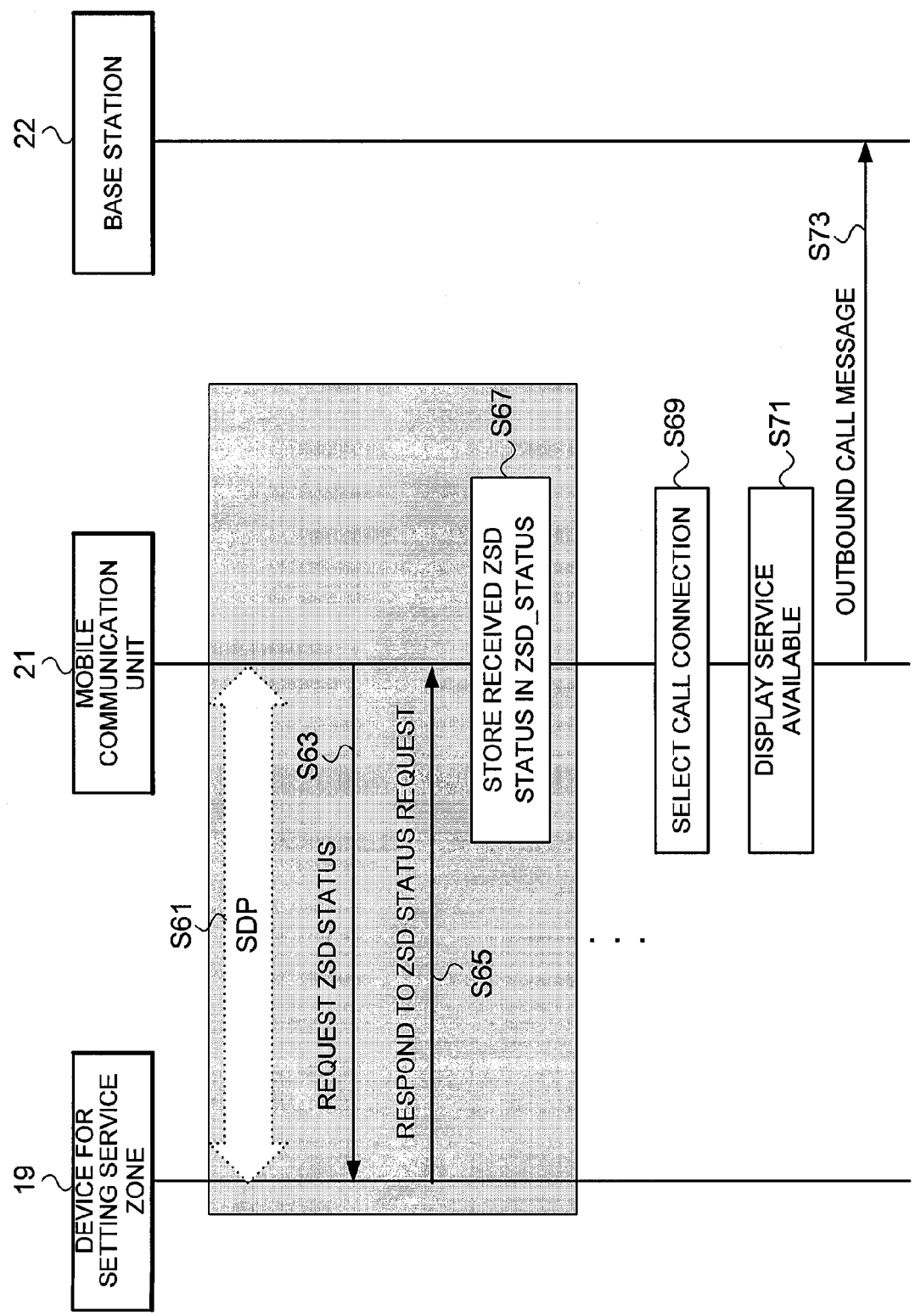
FIG. 12 illustrates a procedure of processing a zone service-based outbound call when an outbound call is tried in a mobile communication unit according to another embodiment of the present invention.

A procedure of processing a zone service-based outbound call when an outbound call is tried in a mobile communication unit according to another embodiment of the present invention will now be described in greater detail with reference to FIGS. 12 and 13.

Figure 11:
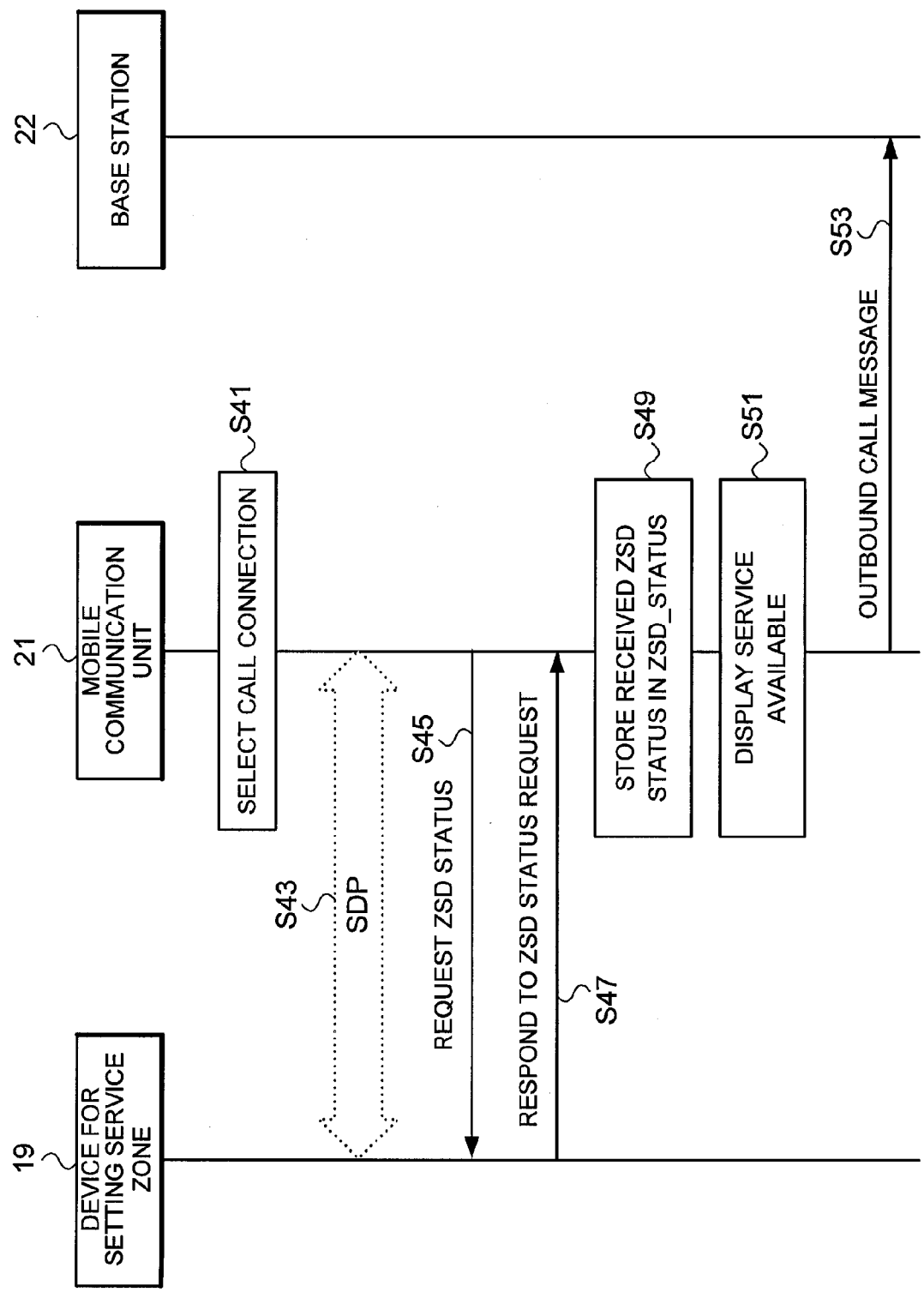
FIG. 11 illustrates a procedure of processing a zone service-based outbound call when an outbound call is tried in a mobile communication unit according to an embodiment of the present invention.

According to the current embodiment of the present invention, steps S61 through S67 that are substantially as steps S43 through S49 illustrated in FIG. 11 are repeatedly performed before the subscriber selects call connection manipulation of the key inputting unit 32 of the mobile communication unit 21. Other matters are the same as in FIG. 11 described above and thus, a detailed description thereof will be omitted.

A procedure of processing a zone service-based outbound call when an outbound call is tried in a mobile communication unit according to another embodiment of the present invention will now be described in greater detail with reference to FIGS. 13 and 14.

Figure 13:
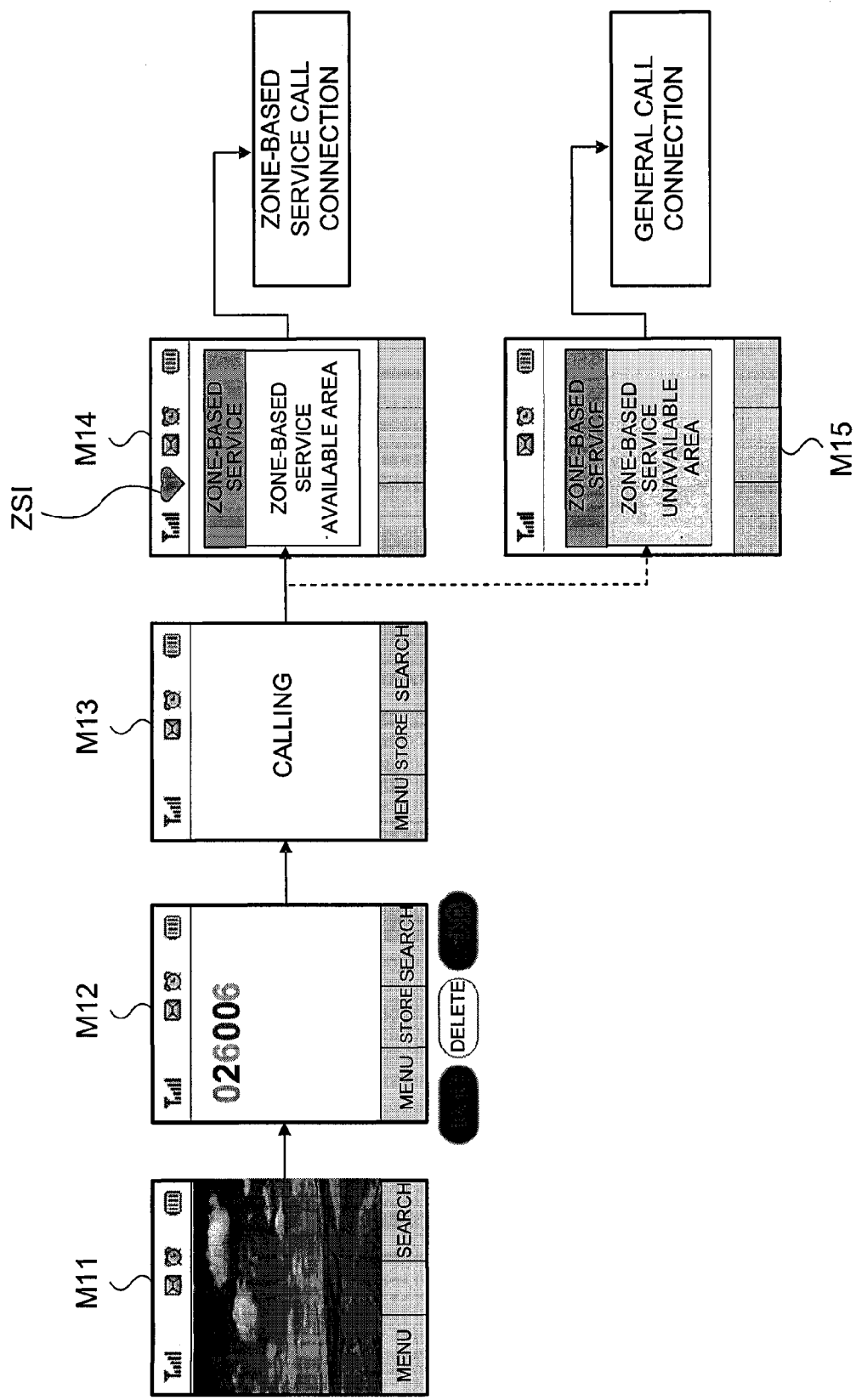
FIG. 13 illustrates an example of a configuration of a screen displayed on a display unit according to the procedure of processing a zone service-based outbound call when an outbound call is tried in the mobile communication unit illustrated in FIG. 6.

According to the current embodiment of the present invention, if a key event having a high probability that a preparatory step for call connection selection by manipulating the mobile communication unit 21 before call connection is selected by manipulation of the key inputting unit 32 occurs (step S81), if steps S83 through S89 that are substantially as steps S43 through S51 illustrated in FIG. 11 are repeatedly performed for a predetermined time (for example, for 1 minute) at regular intervals and the current state is in a state where the zone service is possible, a screen illustrated by M14 of FIG. 13 is displayed on the display unit 34 so that the subscriber can know whether the current state is in the state where the zone-based service is available before the subscriber selects call connection. Other matters are the same as in FIG. 11 described above and thus, a detailed description thereof will be omitted.

Here, the key event is predetermined. The key event includes input of a predetermined key (for example, a number key) of the key inputting unit 32, back-light on of the display unit 34, folder-open in case of a folder type mobile communication unit, and key event such as slide-up in case of a slide type mobile communication unit.

The effect of the embodiments is excellent when they are applied to a service such as a fee discount service or a free service etc. as a zone-based service. The present invention can also be applied to other services.

In addition, the above-described specific embodiments have been described to define that the zone-based service available status is notified to the subscriber on the screen of the display unit in the mobile communication unit. However, the zone-based service available status may also be notified to the subscriber via voice.

INDUSTRIAL APPLICABILITY

As described above, according to the present invention, the device for setting a service zone is employed such that a new and effective zone-based service can be provided to the user.

What is claimed is:

1. A device for setting a service zone for a predetermined zone-based service provided by a mobile communication system for at least one mobile communication unit to which a mobile communication service is provided by the mobile communication system, wherein the device comprises:
    a local area wireless communication means for performing local area wireless communication with the mobile communication unit, wherein the device sets a range in which the local area wireless communication is available as the service zone of the mobile communication unit;
    a memory in which zone setting device status information referred to by the mobile communication unit when the mobile communication unit determines whether zone-based service is available is stored, wherein when the mobile communication unit requests the zone setting device status information the device transmits the zone setting device status information stored in the memory to the mobile communication unit; and
    a moving preventing means for preventing the service zone from being arbitrarily changed after the zone-based service is registered.

2. The device of claim 1, wherein the moving preventing means comprises:
    a moving sensor for sensing a moving degree by setting a state where a location installed when the zone-based service is registered as an initial state and for accumulating the moving degree; and
    a controller, if the accumulated moving degree of the moving sensor exceeds a predetermined threshold value, for setting the zone setting device status information to a connection unavailable state due to the exceeded moving degree.

3. The device of claim 2, wherein the zone setting device status information is referred to by the mobile communication unit in which the zone-based service is registered.

4. The device of claim 3, wherein the local area wireless communication unit comprises one communication mode selected from Bluetooth, wireless local area network (WLAN), radio frequency identification (RFI), and ZigBee communication modes.

5. The device of claim 2, further comprising a power supply unit having a charging battery and a charging unit converting AC power into DC power and charging the charging battery and for allowing power of the charging battery to be supplied only to the moving sensor when external AC power is not applied to each component.

6. The device of claim 5, wherein the local area wireless communication unit comprises one communication mode selected from Bluetooth, wireless local area network (WLAN), radio frequency identification (RFI), and ZigBee communication modes.

7. The device of claim 2, further comprising a wired connection interface for performing data communication using a data communication cable with an external device.

8. The device of claim 7, wherein the local area wireless communication unit comprises one communication mode selected from Bluetooth, wireless local area network (WLAN), radio frequency identification (RFI), and ZigBee communication modes.

9. The device of claim 2, wherein the moving sensor is an acceleration sensor.

10. The device of claim 2, wherein the local area wireless communication unit comprises one communication mode selected from Bluetooth, wireless local area network (WLAN), radio frequency identification (RFI), and ZigBee communication modes.

11. The device of claim 1, wherein the local area wireless communication unit comprises one communication mode selected from Bluetooth, wireless local area network (WLAN), radio frequency identification (RFI), and ZigBee communication modes.

12. The device of claim 1, wherein the local area wireless communication unit comprises one communication mode selected from Bluetooth, wireless local area network (WLAN), radio frequency identification (RFI), and ZigBee communication modes.

13. A system for providing a zone-based service comprising:
    a mobile communication system for providing a mobile communication service including a predetermined zone-based service to a subscriber using a mobile communication unit;
    a mobile communication unit for making communication with the mobile communication system using a mobile communication means, for making communication with a device for setting a service zone using a local area wireless communication means and for connecting the predetermined zone-based service provided by the mobile communication system within a predetermined region using the device for setting a service zone; and
    a device for setting a service zone for performing local area wireless communication with the mobile communication unit using the local area wireless communication means and for setting a range in which the local area wireless communication is available as the service zone of the mobile communication unit,
    wherein when the mobile communication unit requests a zone setting device status information the device for setting a service zone transmits the zone setting device status information stored in the memory to the mobile communication unit and the mobile communication unit refers to the zone setting device status information for determining whether zone-based service is available.

14. The system of claim 13, wherein the mobile communication system comprises an authentication server for registering a zone-based service for a subscriber of the mobile communication unit and the device for setting a service zone.

15. The system of claim 14, wherein the mobile communication unit requests the zone-based service authentication server of service registration using identification information of the device for setting a service zone obtained by local area wireless communication with the device for setting a service zone and own identification information and requests the device for setting a service zone of service registration after the service registration of the zone-based service authentication server, to perform zone-based service registration.

16. The system of claim 15, wherein the device for setting a service zone comprises:
    a moving sensor for sensing a moving degree by setting a state where a location installed when the zone-based service is registered as an initial state and for accumulating the moving degree; and
    a controller, if the accumulated moving degree of the moving sensor exceeds a predetermined threshold value, for setting zone setting device status information to a connection unavailable state due to the exceeded moving degree.

17. The system of claim 16, wherein the zone setting device status information is referred to by the mobile communication unit in which the zone-based service is registered.

18. The system of claim 17, wherein the mobile communication unit requests the device for setting a service zone of zone setting device status information and analyses the zone setting device status information received from the device for setting a service zone and if it is checked that the device for setting a service zone is in the normal state when a try of outbound call connection is made by a subscriber after service registration with the device for setting a service zone is completed, inserts information indicating that a corresponding outbound call is a zone service-based outbound call into an outbound call message to the mobile communication system to perform outbound call processing.

19. The system of claim 18, wherein the mobile communication unit stores the received zone setting device status information and notifies the zone-based service available status to the subscriber if it is checked that the device for setting a service zone is in the normal state.

20. The system of claim 19, wherein the mobile communication unit notifies the subscriber that the zone-based service is available, using at least one of a screen display and voice.

21. The system of claim 20, wherein the screen display comprises at least one of a character, a symbol, and an icon.

22. The system of claim 18, wherein, if it is checked that the zone setting device status information is not received from the device for setting a service zone or the device for setting a service is not in the normal state, the mobile communication unit inserts information indicating that a corresponding outbound call is a general outbound call into an outbound call message to the mobile communication system when a try of outbound call connection is made by a subscriber, to perform outbound call processing.

23. The system of claim 18, wherein, when the zone-based service is a fee discount service, information indicating a zone service-based outbound call included in the outbound call message is transmitted to an accounting server of the mobile communication system and a fee discount of the corresponding outbound call is applied by the accounting server.

24. The system of claim 17, wherein the mobile communication unit periodically performs a procedure of requesting the device for setting a service zone of zone setting device status information, analysing the zone setting device status information received from the device for setting a service zone and checking whether the zone-based service is available after service registration with the device for setting a service zone is completed, and when a try of outbound call connection is made by a subscriber, if it is checked that the zone-based service is available, inserts information indicating that a corresponding outbound call is a zone service-based outbound call into an outbound call message to the mobile communication system to perform outbound call processing.

25. The system of claim 24, wherein the mobile communication unit stores the received zone setting device status information and if it is checked that the device for setting a service zone is in the normal state, notifies the subscriber that the zone-based service is available.

26. The system of claim 25, wherein the mobile communication unit notifies the subscriber that the zone-based service is available, using at least one of a screen display and voice.

27. The system of claim 26, wherein the screen display comprises at least one of a character, a symbol, and an icon.

28. The system of claim 24, wherein, when the zone-based service is a fee discount service, information indicating a zone service-based outbound call included in the outbound call message is transmitted to an accounting server of the mobile communication system and a fee discount of the corresponding outbound call is applied by the accounting server.

29. The system of claim 17, wherein the mobile communication unit periodically performs a procedure of requesting the device for setting a service zone of zone setting device status information, analysing the zone setting device status information received from the device for setting a service zone and checking whether the zone-based service is available after service registration with the device for setting a service zone is completed and when an event of a try of outbound call is made by a subscriber, if it is checked that the zone-based service is available, inserts information indicating that a corresponding outbound call is a zone service-based outbound call into an outbound call message to the mobile communication system to perform outbound call processing.

30. The system of claim 29, wherein the mobile communication unit stores the received zone setting device status information and if it is checked that the device for setting a service zone is in the normal state, notifies the subscriber that the zone-based service is available.

31. The system of claim 30, wherein the mobile communication unit notifies the subscriber that the zone-based service is available, using at least one of a screen display and voice.

32. The system of claim 31, wherein the screen display comprises at least one of a character, a symbol, and an icon.

33. The system of claim 29, wherein the event is at least one of input of a predetermined key of a mobile communication unit, backlight-turn-on of a display unit, folder-open in case of a folder type mobile communication unit, and slide-up in case of a slide type mobile communication unit.

34. The system of claim 29, wherein, when the zone-based service is a fee discount service, information indicating a zone service-based outbound call included in the outbound call message is transmitted to an accounting server of the mobile communication system and a fee discount of the corresponding outbound call is applied by the accounting server.

35. The system of claim 16, wherein the controller of the device for setting a service zone sets hardware abnormal status information indicating whether hardware of the device for setting a service zone is abnormal, power defective status information indicating that a supply of power is stopped, and continuous reset try status information indicating that a continuous reset try occurs, as additional zone setting device status information.

36. A method of providing a zone-based service in a mobile communication system for providing a mobile communication service including a predetermined zone-based service to a subscriber via a mobile communication unit, the method comprising setting a range of a device for setting a service zone for performing local area wireless communication with the mobile communication unit in which the local area wireless communication is available, as the service zone and providing the zone service to the mobile communication unit located in the service zone, wherein the mobile communication system comprises an authentication server for registering a zone-based service for a subscriber of the mobile communication unit and the device for setting a service zone, and the device for setting a service zone comprises a moving sensor for sensing a moving degree and for accumulating the moving degree, and if the accumulated moving degree of the moving sensor exceeds a predetermined threshold value, for setting zone setting device status information to a connection unavailable state due to the exceeded moving degree.

37. The method of claim 36, wherein the zone setting device status information is referred to by the mobile communication unit in which the zone-based service is registered.

38. The method of claim 37, further comprising:
obtaining identification information of the device for setting a service zone by performing local area wireless communication with the device for setting a service zone according to a zone service registration request;
requesting the zone-based service authentication server of service registration using the obtained identification information of the device for setting a service zone and own identification information, receiving a service registration response from the zone-based service authentication server and performing service registration with the zone-based service authentication server; and
requesting the device for setting a service zone of service registration, receiving a service registration response from the device for setting a service zone and performing service registration with the device for setting a service zone.

39. The method of claim 38, wherein, in the requesting of the device for setting a service zone of service registration, the receiving of the service registration response and the performing of the service registration, the device for setting a service zone initializes the moving sensor when receiving the service registration request, setting a location installed when the zone-based service is registered as an initial state and transmitting a service registration response to the mobile communication unit.

40. The method of claim 39, wherein the mobile communication unit requests the device for setting a service zone of zone setting device status information and analyses the zone setting device status information received from the device for setting a service zone and if it is checked that the device for setting a service zone is in the normal state when a try of outbound call connection is made by a subscriber after service registration with the device for setting a service zone is completed, inserts information indicating that a corresponding outbound call is a zone service-based outbound call into an outbound call message to the mobile communication system to perform outbound call processing.

41. The method of claim 40, wherein the mobile communication unit stores the received zone setting device status information and notifies the zone-based service available status to the subscriber if it is checked that the device for setting a service zone is in the normal state.

42. The method of claim 40, wherein, when the zone-based service is a fee discount service, information indicating a zone service-based outbound call included in the outbound call message is transmitted to an accounting server of the mobile communication system and a fee discount of the corresponding outbound call is applied by the accounting server.

43. The method of claim 39, wherein the mobile communication unit periodically performs a procedure of requesting the device for setting a service zone of zone setting device status information, analysing the zone setting device status information received from the device for setting a service zone and checking whether the zone-based service is available after service registration with the device for setting a service zone is completed, and when a try of outbound call connection is made by a subscriber, if it is checked that the zone-based service is available, inserts information indicating that a corresponding outbound call is a zone service-based outbound call into an outbound call message to the mobile communication system to perform outbound call processing.

44. The method of claim 43, wherein the mobile communication unit stores the received zone setting device status information and if it is checked that the device for setting a service zone is in the normal state, notifies the subscriber that the zone-based service is available.

45. The method of claim 43, wherein, when the zone-based service is a fee discount service, information indicating a zone service-based outbound call included in the outbound call message is transmitted to an accounting server of the mobile communication system and a fee discount of the corresponding outbound call is applied by the accounting server.

46. The method of claim 39, wherein the mobile communication unit periodically performs a procedure of requesting the device for setting a service zone of zone setting device status information, analysing the zone setting device status information received from the device for setting a service zone and checking whether the zone-based service is available after service registration with the device for setting a service zone is completed and when an event of a try of outbound call is made by a subscriber, if it is checked that the zone-based service is available, inserts information indicating that a corresponding outbound call is a zone service-based outbound call into an outbound call message to the mobile communication system to perform outbound call processing.

47. The method of claim 46, wherein the mobile communication unit stores the received zone setting device status information and if it is checked that the device for setting a service zone is in the normal state, notifies the subscriber that the zone-based service is available.

48. The method of claim 46, wherein the event is at least one of input of a predetermined key of a mobile communication unit, backlight-turn-on of a display unit, folder-open in case of a folder type mobile communication unit, and slide-up in case of a slide type mobile communication unit.

49. The method of claim 46, wherein, when the zone-based service is a fee discount service, information indicating a zone service-based outbound call included in the outbound call message is transmitted to an accounting server of the mobile communication system and a fee discount of the corresponding outbound call is applied by the accounting server.

50. The method of claim 38, wherein, in the requesting of the zone-based service authentication server of service registration, the receiving of a service registration response and the performing of service registration, the service registration request to the authentication server and the service registration response from the authentication server are comprised of a short message having a teleservice identifier (TID).

* * * * *